(12) United States Patent
Ram et al.

(10) Patent No.: US 7,448,022 B1
(45) Date of Patent: Nov. 4, 2008

(54) DYNAMIC SOFTWARE COMPOSITION IN A COMPONENT-BASED SOFTWARE SYSTEM

(75) Inventors: Prasad Ram, Bangalore (IN); Arun Ramanujapuram, Bangalore (IN); Robert Schuler, Hermosa Beach, CA (US)

(73) Assignee: Prasad Ram, Bangalore (IN)

( * ) Notice: Subject to any disclaimer, the term of this patent is extended or adjusted under 35 U.S.C. 154(b) by 830 days.

(21) Appl. No.: 10/775,383

(22) Filed: Feb. 10, 2004

(51) Int. Cl.
*G06F 9/45* (2006.01)
(52) U.S. Cl. .................................... 717/120
(58) Field of Classification Search .................. 717/120
See application file for complete search history.

(56) References Cited

U.S. PATENT DOCUMENTS

| | | | |
|---|---|---|---|
| 5,596,750 A | 1/1997 | Li et al. ........................ 718/101 |
| 5,848,403 A | 12/1998 | Gabriner et al. ............... 706/13 |
| 5,963,911 A | 10/1999 | Walker et al. ................... 705/7 |
| 6,148,324 A | 11/2000 | Ransom et al. ............. 718/105 |
| 6,330,008 B1 | 12/2001 | Razdow et al. .............. 715/772 |
| 6,571,215 B1 * | 5/2003 | Mahapatro ...................... 705/8 |
| 6,587,860 B1 | 7/2003 | Chandra et al. ............. 707/202 |
| 6,587,865 B1 | 7/2003 | Kimbrel et al. ............. 718/104 |
| 6,594,651 B2 | 7/2003 | Kabra et al. .................... 707/2 |
| 6,711,606 B1 | 3/2004 | Leymann et al. ............ 709/203 |
| 6,741,959 B1 | 5/2004 | Kaiser ............................ 704/7 |
| 6,772,030 B1 * | 8/2004 | Huang .......................... 700/103 |
| 6,850,895 B2 | 2/2005 | Brodersen et al. ............... 705/9 |
| 6,928,646 B1 | 8/2005 | James et al. ................ 718/104 |
| 7,003,475 B1 * | 2/2006 | Friedland et al. ............... 705/9 |
| 7,010,521 B2 | 3/2006 | Hinshaw et al. ............. 707/13 |
| 7,107,255 B2 | 9/2006 | Kiernan et al. .................. 707/2 |
| 7,133,842 B2 | 11/2006 | Harif ........................... 705/37 |
| 7,152,157 B2 * | 12/2006 | Murphy et al. .............. 713/100 |
| 2001/0051949 A1 | 12/2001 | Carey et al. .............. 707/102 R |
| 2002/0013777 A1 | 1/2002 | Diener ........................... 707/1 |
| 2002/0073080 A1 | 6/2002 | Lipkin ........................... 707/3 |
| 2002/0152190 A1 | 10/2002 | Biebesheimer et al. ......... 707/1 |
| 2003/0061261 A1 | 3/2003 | Greene ....................... 709/104 |
| 2003/0061265 A1 | 3/2003 | Maso et al. ................. 709/105 |
| 2003/0079041 A1 | 4/2003 | Parrella et al. .............. 709/247 |

(Continued)

OTHER PUBLICATIONS

Kabra et al., "Efficient Mid-Query Re-Optimization of Sub-Optimal Query Execution Plans" Jun. 1998, ACM Press, vol. 27, Issue 2, pp. 106-117.

(Continued)

*Primary Examiner*—John Chavis
(74) *Attorney, Agent, or Firm*—Irell & Manella LLP

(57) ABSTRACT

A resource catalog system comprises a catalog organized as a set of metadata structures representing distributed system resources, language for resource invocation, and a query interpreter and optimizer. Query optimization includes dynamic functional composition by modeling resources according constraints and determining constraint-satisfaction to compose an execution plan. Query optimization may also include dynamic selection and scheduling of resources by combining a resource scheduling with adaptive feedback. The resources may comprise distributed software components, application programs, shell scripts, executables, and services. The resource catalog system accepts queries for operations on distributed resources through a declarative language or a procedural language. A query optimizer derives catalog operators from a query or elsewhere and accesses the system resources according to interpretation of the catalog operators. The optimizer also retrieves information concerning the location and/or physical interfaces of the system resources to fulfill the commands specified by the catalog operators.

9 Claims, 17 Drawing Sheets

U.S. PATENT DOCUMENTS

| | | | |
|---|---|---|---|
| 2003/0084025 A1 | 5/2003 | Zuzarte | 707/2 |
| 2003/0093410 A1 | 5/2003 | Couch et al. | 707/3 |
| 2003/0167329 A1 | 9/2003 | Kurakake et al. | 709/226 |
| 2004/0078686 A1 | 4/2004 | Toyooka et al. | 714/38 |
| 2004/0148610 A1 | 7/2004 | Tsun et al. | 719/316 |
| 2004/0158568 A1 | 8/2004 | Colle et al. | 707/100 |
| 2004/0186829 A1 | 9/2004 | Suzuki et al. | 707/3 |
| 2004/0205206 A1 | 10/2004 | Naik et al. | 709/230 |
| 2004/0226013 A1 | 11/2004 | Mariotti et al. | 718/100 |
| 2004/0230317 A1* | 11/2004 | Kumar et al. | 700/1 |
| 2004/0230675 A1 | 11/2004 | Freimuth et al. | 709/223 |
| 2005/0132371 A1 | 6/2005 | Lopez-Estrada | 718/100 |
| 2007/0107052 A1 | 5/2007 | Cangini et al. | 726/22 |

OTHER PUBLICATIONS

Sousa et al., "A distributed architecture and negotiation protocol for scheduling in a manufacturing systems," Elsevier Science B.V., 1999, pp. 103-113.

Steinacker et al., "Standards: Metadata standards for web-based resources", 2001, IEEE, pp. 70-76.

Xu et al., "ANT Algorithm-based task scheduling in grid system," 2003, IEEE, pp. 1107-1110.

Ceri et al., "Extending WebML for modeling multi-channel context-aware web appoications," 2003, IEEE, pp. 1-9.

* cited by examiner

1100

1110   1120

INVOKE SEARCH_SERVICE.search, WM_SERVICE.watermark, DELIVERY_SERVICE.send
    WHERE
        ( /search_service/country = 'USA' OR /search_service/country = 'EUROPE' ) AND
1130      /search_service/data_size < 1,00,000 AND
        /SLA/response_time < 10 AND    1140
        /SLA/cost < $2
    GIVEN
        /search/location = 'internet-catalog' AND
1150      /search/results_format = 'XML' AND
        /search/max_results < 1000 AND    1160
        /search/criteria = "camera AND SONY ..." AND
        /watermark/type = 'text' AND
        /watermark/label = '© Acme. All Rights Reserved.' AND
        /watermark/placement = 'bottom-left' AND
        /delivery/type = 'email' AND
        /delivery/address = 'joe@z.com'
    RESULTS
        /search/tracking_id
1170
        1180

⎡ 1210
<?xml version="1.0" encoding="UTF-8" ?>  ⎡ 1220
<script major="1" minor="0" name="Example Script" access="public">

<var name="queryResults" type="string" access="public" />  ⎡ 1230
  <var name="catalogName" type="string" access="private" />

...   ⎡ 1240

<task name="primary">    ⎡ 1250

<assign var="catalogName" select="'Electronics Catalog'" />

...

<call op="xci:acme.utility.SearchInitializer::initialize">
    <in name="catalog" select="$catalogName" />
    ...additional input parameters...
    <out name="criteria" select="$xmlCriteria" />   ⟍ 1260
    ...additional output parameters...
  </call>

<if test="not $bCached"> ⎡ 1270
                                               ⎡ 1280

<query expression="'INVOKE MetadataExportService WHERE
    (/data/source=realestatecatalog AND /conversion/format=pdf)'"
    result="$queryResults"/>

...

</if>

<spawn tasks="taskA taskB"/>

...   ⟍ 1290

</task>

...

</script>

```xml
<?xml version="1.0"?>

<component
    major="1"         1320
    minor="0"
    package="acme.example"
    name="Workflow">

<metadata
      version="200"          1330
      createdBy="Acme, Inc."
      comment="Workflow provides an interface to the Workflow Manager in the Server."/>

<operation         1340
      name="doWork"
      access="public">         1350

<in name="binding" type="string"/>
    <in name="deadline" type="string"/>
    <out name="status" type="string"/>
                                                1360
    <throws>
      <fault name="exception:InvalidParameterException"/>
      <fault name="exception:BindingException"/>
      <fault name="exception:InternalException"/>
    </throws>

<implementation type="javaClass">
      <java classname="acme.example.WorkflowManagerInterface"
            methodname="submitWork"/>
    </implementation>                     1370

</operation>

</component>
```

FIG. 13

| Symbol | Description |
|---|---|
| $w_i$ | Worst-case time requirements for task i. |
| $t_i$ | Period for task i. |
| $d_i$ | Deadline for task i. |
| T | Set of tasks. |
| $T_i$ | The $i^{th}$ task characterized by $\{[t_i,] [d_i,] w_i\}$. |
| c | The selection criteria for a set of tasks. Represents a collection of conditions, rules or other constraints. E.g., c := { (capability = 'image conversion') AND (format = 'tiff') }. |
| p | The profile for the owner of the task submission. Includes preferences, service contracts, provider relationships, etc. |
| j | Job submission as defined by { c, p, T } |
| $R_{all}$ | Set of all resources available to the systems. |
| $R_i$ | The $i^{th}$ resource. |
| $R_{sub}$ | A selected subset of $R_{all}$ that conforms to the selection criteria c. |
| $R_{bid}$ | A refined subset of $R_{sub}$ that satisfies negotiation criteria specified within p. |
| s | Priority score for an input set. |
| u | Response from a resource pertaining to completion of a task, $T_i$. |
| f | Feedback gleaned from a response u. |
| Q | Ready queue of input events awaiting dispatch processing. |
| $Q_i$ | The $i^{th}$ item in the ready queue defined by $\{s, T, [R_{sub} | R_{bid}]\}$. |
| $Q_i^k$ | The $k^{th}$ task of the $i^{th}$ item from the ready queue defined by $\{s, T_k\}$. |
| P | Pending queue of tasks processed by resources and awaiting results. |
| $P_k$ | The kth item in the pending queue as defined by $\{s, T_k, R_i\}$ |
| M | Mapped collection of task signatures to task results, to be described later. The collection M maintains a limited history of the actual results after processing of a task i. |
| V | Resource reservations list. |
| H | Historical information collection. Include observed performance metrics, service level agreement compliance, error rate, etc. |

FIG. 14A

DYNAMIC SOFTWARE COMPOSITION IN A COMPONENT-BASED SOFTWARE SYSTEM

BACKGROUND OF THE INVENTION

1. Field of the Invention

The field of the present invention relates to methods and systems for managing software composition in a component-based software system.

2. Background

Computer systems continue to grow in complexity due to the proliferation of heterogeneous application programs, software tools, external services, and data repositories. In an enterprise environment, system resources and data are often widely distributed and can be moved from time to time to different directories, structures, or machines, or otherwise converted, replaced or modified. The heterogeneous nature of system components, their differing interfaces and data structures, their fragmentation across an enterprise, and their dynamic nature can lead to problems with, among other things, developing new applications, maintaining existing applications, and making optimal use of system resources.

Applications often need to share data, interoperate, and accommodate overlapping processes. Effective interoperation between applications generally requires the ability to share information including complex data found in unstructured or loosely structured formats, such as spreadsheets, images, and audio-visual data. Sharing information, however, may require execution of complex operations including conversion of documents and spreadsheets, encoding of media, encryption for secure storage and/or transmission, data compression, and other such tasks. These operations can involve many tools from different vendors and tend to be computationally intensive, thus requiring adequate resource management to achieve optimal performance.

Unfortunately for system programmers and users, most software applications are designed and built as standalone products without much thought given to their interoperability with other applications. Programmers and users are thus typically left to awkward manual techniques for attempting to integrate the functionality of disparate system components.

Efficiently developing and deploying applications in contexts that involve multiple tools, disparate data repositories, and external services is a significant challenge and an unsolved problem. Organizations often need to bring together distributed resources—which may be referred to as software components—into a seamless application in order to achieve automation of more complex software processes. Organizations lacking distributed applications typically must employ numerous, inefficient manual processes to bridge the gap between standalone applications.

Development and maintenance of distributed applications is made difficult in view of dependencies arising from distributed resources. In order to build a distributed application, the developer generally must know the exact interface of each distributed software component, identify what lookup service is required to locate each component, adjust for the specific implementation type of each component, and bridge differences in communications and other infrastructure characteristics between the various distributed components. The developer also generally must know the exact formats and structures of data throughout the distributed environment. Adding to the burden, related information is often fragmented across different repositories. Each repository typically has a unique connectivity and query interface. Using distributed data forces the application developer into many tasks of data manipulation and management not central to the primary task of implementing custom application functionality.

The most common conventional solutions to deal with the distributed computing problem include custom development and middleware. Custom developed code tends to be costly, inflexible, difficult to maintain, and time consuming. Developers can easily spend more energy on building linkages between resources than on developing application functionality. Although middleware can in certain situations provide relatively reliable communication between applications, managed software components, and other system components, middleware generally does not address problems related to resource dependency.

SUMMARY OF THE INVENTION

In one aspect, systems and methods are provided for management and manipulation of distributed resources. A resource catalog system comprises a catalog of resources, a language to express resource invocation, a language interpreter, and an optimizer. The resources preferably comprise at least one software component, application program, or service. Resources generally expose one or more functions that may be utilized by the resource catalog system. For instance, a data archival resource exposes a function to store data and a function to retrieve data. The functions exposed by the resources managed by the catalog form the collection of catalog operators that may be executed by the resource catalog system. The optimizer is preferably configured to receive catalog operators from, e.g., the interpreter, and to access the resources (by, e.g., utilizing the functions managed by the resource catalog) according to interpretation of the catalog operators.

In one or more embodiments, the catalog may have the effect of shielding developers and users of distributed applications to a significant degree from dependencies inherent in a distributed computing environment. For example, the invocation language may refer to system resources without reference to their location or physical interfaces. An intermediary application may be provided which retrieves information concerning the location and/or physical interfaces of the various system resources to fulfill the operations derived from the invocation language.

Further embodiments, variations, modifications, and enhancement are also described herein within the detailed description and/or illustrated in the accompanying figures.

BRIEF DESCRIPTION OF THE DRAWINGS

The present invention and its advantages may be better understood by reference to the drawings, wherein:

FIG. 11 is an example of a query expressed in a declarative language, as may be used to interact with a resource catalog system according to one embodiment as disclosed herein.

FIG. 12 is an example of a script expressed in a procedural language extension to the declarative language, as may be used to interact with a resource catalog system according to one embodiment as disclosed herein.

FIG. 13 is an example of a component interface description as may be used by scripts to interact with native software components according to one embodiment as disclosed herein.

FIG. 14A is a diagram of a table listing and describing symbols used in connection with an exemplary method for dynamic selection and scheduling of resources in a resource catalog system.

DESCRIPTION OF PREFERRED EMBODIMENTS

Figure 1:
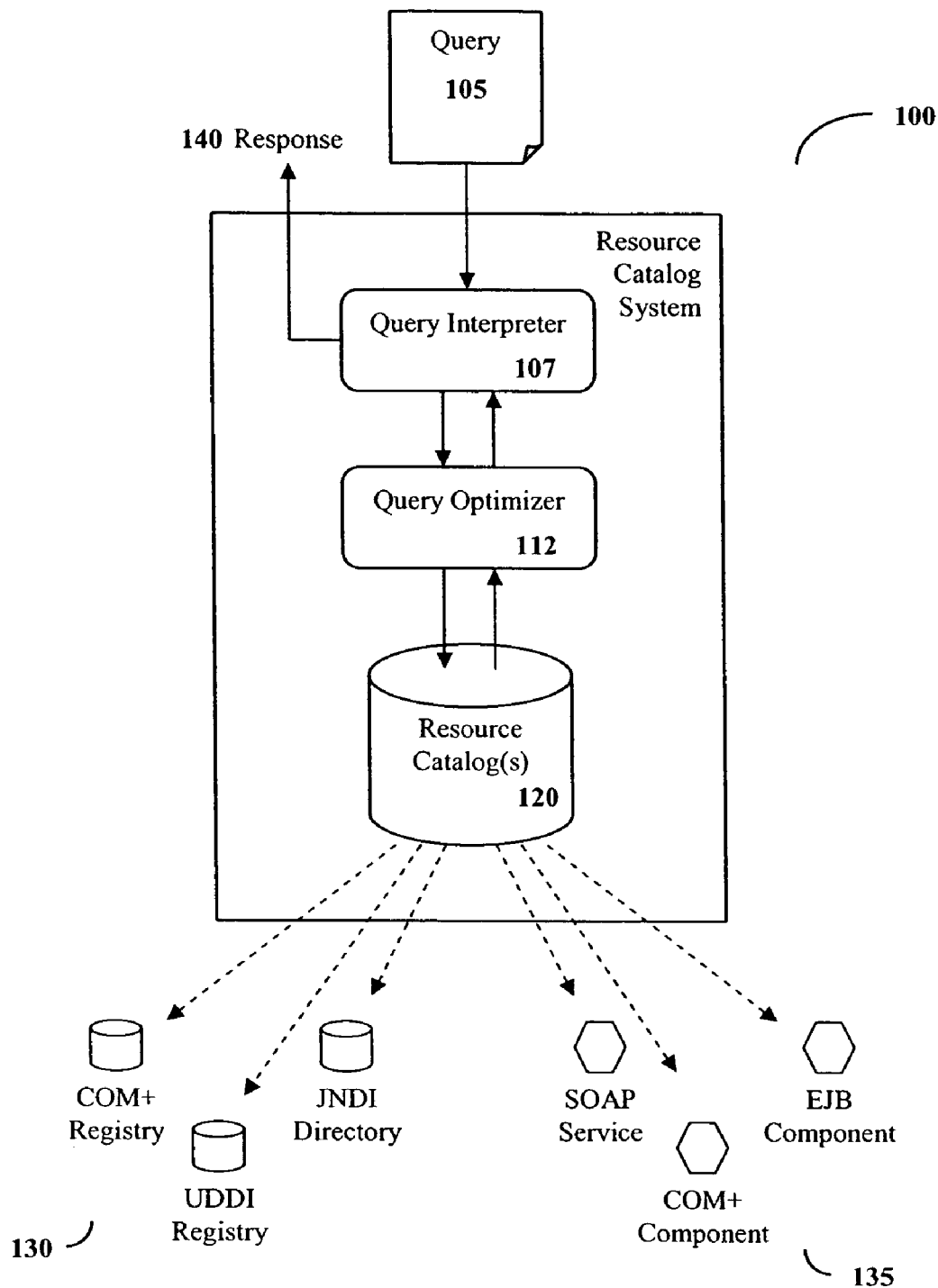
FIG. 1 is a functional block diagram of a resource catalog system in accordance with one embodiment as disclosed herein.

In one or more embodiments as disclosed herein, a computerized system includes a catalog of resources organized as a set of flexibly-described metadata structures, a resource invocation language, a language interpreter, and an optimizer, which are collectively employed to manage resources, thereby advantageously facilitating development, maintenance and optimization of distributed applications. Preferably, the catalog of resources accommodates representation of a wide variety of data types including structured, semi-structured, and unstructured, and may be independent of the physical storage configuration and the distributed services configuration of the underlying distributed computing environment. The catalog of resources also preferably supports representation of a wide variety of resources including but not limited to software components, software services, online services, data repositories, and various other tools and applications.

Each resource may be said to "expose" one or more functions, and the collection of all functions available to the resource catalog system generally represents the supported set of catalog operators of the resource catalog. Other systems or applications may interact with the resource catalog system by issuing statements, also referred to as queries, expressed in a resource invocation language that may be interpreted to derive a set of catalog operators and a plan of execution. Execution of a query preferably involves invocation of various software resources through catalog operators. A management infrastructure integrated or compatible with the catalog of resources may be provided to permit planning, scheduling, optimization and execution of catalog operators.

Preferred system architectures and operational details are discussed later herein. First, however, additional details are provided concerning limitations inherent in resource and data-related dependencies, which may be overcome by employing various techniques described in connection with one or more embodiments herein.

As previously described in the Background hereof, applications within an enterprise often need to share data, interoperate, and accommodate overlapping processes in an effective and efficient manner. Data to be shared may be stored in unstructured or loosely structured formats, such as spreadsheets, images, and audio-visual data. To share such data may require execution of complex operations including conversion of documents and spreadsheets, encoding of media, encryption for secure storage and/or transmission, data compression, and other such tasks. These operations can involve many software tools located in different parts of the system, each having their own unique interfaces and characteristics.

The existence of distributed and disparate software resources generally results in a number of dependencies for distributed applications, including the following:

Interface dependency: Applications are bound to and dependent upon the particular software interface of a particular resource, which may include, e.g., process or resource names, parameters names, parameter order, and so on. Changing this "signature" renders the resource inaccessible to a distributed application coded to interact with the resource via its original interface.

Implementation dependency: Applications are bound to and dependent upon the particular implementation of each software resource—for example, as an executable, a reusable component, an enterprise application, or an online service.

Access dependency: Applications depend upon particular heterogeneous lookup services for accessing distributed software resources. For example, some software may be locatable only via service registries, others only by using naming services, and others only through primitive directory paths.

Infrastructure dependency: Applications are dependent upon different infrastructure based on the particular software resources to be employed. Some software resources, for example, may require interacting asynchronously using a messaging middleware, while others may interact synchronously via request brokers.

Software resource dependencies bind application code to specific interfaces, implementations, access services, and infrastructure, thus entangling application logic with software integration and coordination details. Consequently, any changes to the specific interfaces, implementations, access services, and infrastructure utilized by any of the software resources to be utilized by a distributed application may effectively prevent the application for working properly. Maintaining distributed applications in the face of a dynamically changing enterprise environment can therefore be quite challenging.

In addition to having dependencies upon distributed software resources, distributed applications also rely upon specific data interfaces, formats and structures, and are thus not shielded from the underlying complexities of data as it pertains to distributed resources. Building distributed applications generally requires that the application developer know the exact formats and structures of data throughout the distributed environment. Unfortunately, related data are often fragmented across different, distributed repositories. Each heterogeneous repository may have its own unique connectivity and query interface. Distributed data relevant to system resources may produce one or more of the following dependencies for distributed applications:

Connectivity dependency: Applications generally depend upon heterogeneous connectivity interfaces, including various standard and proprietary database connectivity interfaces, file system connectivity interfaces, and proprietary connectivity interfaces of popular asset management and document management systems.

Query dependency: Applications accessing disparate data resources often must employ a variety of query languages, including standard SQL queries, XML queries for current and emerging variations of XML, vendor-specific search engine queries, and proprietary asset management and document management system queries.

Structure dependency: Applications may have to contend with various levels of structure in distributed data, including structured (e.g., relational databases), semi-structured (e.g., XML documents), and unstructured (e.g., text and rich media).

Schema dependency: Applications depend upon data resource-specific schemas of structured information. For example, the physical schema of a relational database presents a highly structured form, in which any changes to the schema will potentially break application code.

Format dependency: Applications must contend with different data formats, particularly for unstructured information, which comes in many types of formats including document, spreadsheet, image, audio, visual, and other rich media formats.

Fragmentation dependency: Applications often must deal with vertically- and horizontally-fragmented data across disparate distributed data repositories.

Data dependencies tend to bind application code to specific connectivity interfaces, queries, structures, schemas, formats and fragmentations, thus entangling application logic with data manipulation and management details. Changes to the how or where data is stored can therefore prevent distributed applications from functioning properly and/or create enormous maintenance burdens on application developers and programmers.

The inefficiencies caused by distributed resources can be significant. Resource dependencies such as those described above can lead to inefficient or cumbersome manipulation and management of data stored or maintained in distributed repositories. Data related dependencies result in tight coupling of application code with physical data structures. A developer using conventional approaches is typically left with the task of incorporating fragmented data from distributed repositories of normalized data along with the task of coordinating the manipulation of unstructured data, proper handling of which generally requires numerous format-specific tools. The developer often must focus extensive effort on resource-specific, platform-specific, and application-specific data access and management, rather than, for example, writing the application to simply retrieve the desired view and form of data from the system.

Resource dependencies may lead to inefficient integration and coordination of distributed resources (e.g., distributed software components, tools, applications, and online services). Coordinating the activities of and between distributed resources using conventional approaches can be an overwhelming task, the scope of which is essentially unknowable before actual programming begins. The real-time demands on a distributed application as the availability and loading of various distributed resources changes may exceed the developer's ability to model a static system that copes with the fluctuating load on different resources. Tightly coupled integration logic dispersed throughout applications hinders development of formal models of resource optimization and synergy. Without proper optimization to efficiently and synergistically invoke resources according to real-time activities, there may be substantial underutilization of available resources.

Resource dependencies also generally lead to inefficient implementation and maintenance in order to support custom processes. Reliance on application logic to bridge gaps in data access and services integration results in a glut of custom code tightly interwoven with the adventitious workings of the underlying distributed computing environment. The resulting additional development overhead contributes to wasted development time, expensive development efforts, and long deployment schedules.

Besides the inefficiencies described above, additional symptoms of the distributed computing problem may arise. Some of these additional symptoms include development redundancies due to ignorance of previous solutions in the distributed environment; failure risk stemming from the fact that most customized distributed computing solutions are only as strong as the weakest link in their chain of utilized resources; over utilization of the best resources instead of optimized load balancing of all distributed resources; and the cost and risk entailed by data migration to a central repository, where migration is implemented to alleviate resource dependencies caused by data federation among heterogeneous distributed repositories.

FIG. 1 is a functional block diagram of a resource catalog system 100 in accordance with one embodiment as disclosed herein. As shown in FIG. 1, the resource catalog system 100 comprises a query interpreter 107, the nature of which will be described in various forms in more detail later herein, configured to receive invocation language statements 105 and render them in a manner suitable for a query optimizer 112. The query optimizer 112 draws upon one or more resource catalogs 120 which provide access to resources, examples of which are illustrated collectively as 130 and 135 in FIG. 1. In one embodiment, a resource catalog 120 comprises a collection of resources organized as a set of flexibly-described metadata structures from which resources (i.e., 130 and 135) can be accessed, manipulated or invoked in different ways without regard to the underlying distributed computing environment.

The resource catalog 120 is preferably independent of the physical storage configuration and the distributed services configuration of the underlying distributed computing environment. Resources may be located from within or accessible through a variety of heterogeneous lookup services for software components 130, including, for example, JNDI (Java Naming and Directory Interface), UDDI (Universal Description, Discovery & Integration), CORBA (Common Object Request Broker Architecture), and COM+ (an extension of Microsoft Corp.'s Component Object Model) registries. Resources 130 and 135 may be local or dispersed throughout the environment. Software composition may be carried out within the resource catalog system 100 through the query optimizer 112 and other infrastructure for planning, scheduling, optimization and execution of operators. This optimization infrastructure allows for formal models and measured results for specific optimization of operators based on the comparative capabilities of available distributed resources.

The resource catalog system 100 described with respect to FIG. 1 may, in certain embodiments, shield developers of distributed applications from the dependencies incurred by the distributed computing environment, and thus allow their applications to avoid or mitigate the inefficiencies of cumbersome data manipulation, underutilization of resources and overhead of custom development. Catalog-based resource management tends to be largely independent of physical storage configuration, data format, and data content, and directly facilitates planning, scheduling, optimization, and execution of the use of distributed resources using a relatively simple interface which does not require the user to know the local particulars of the distributed computing environment. The resource catalog system can operate as a resource manager across an entire enterprise. In effect, it fulfills duties similar to a cross-enterprise "operating system," except that it provides integrated management of an enterprise-wide distributed computing environment, rather than isolated management of a single resource as do most operating systems.

Figure 3:
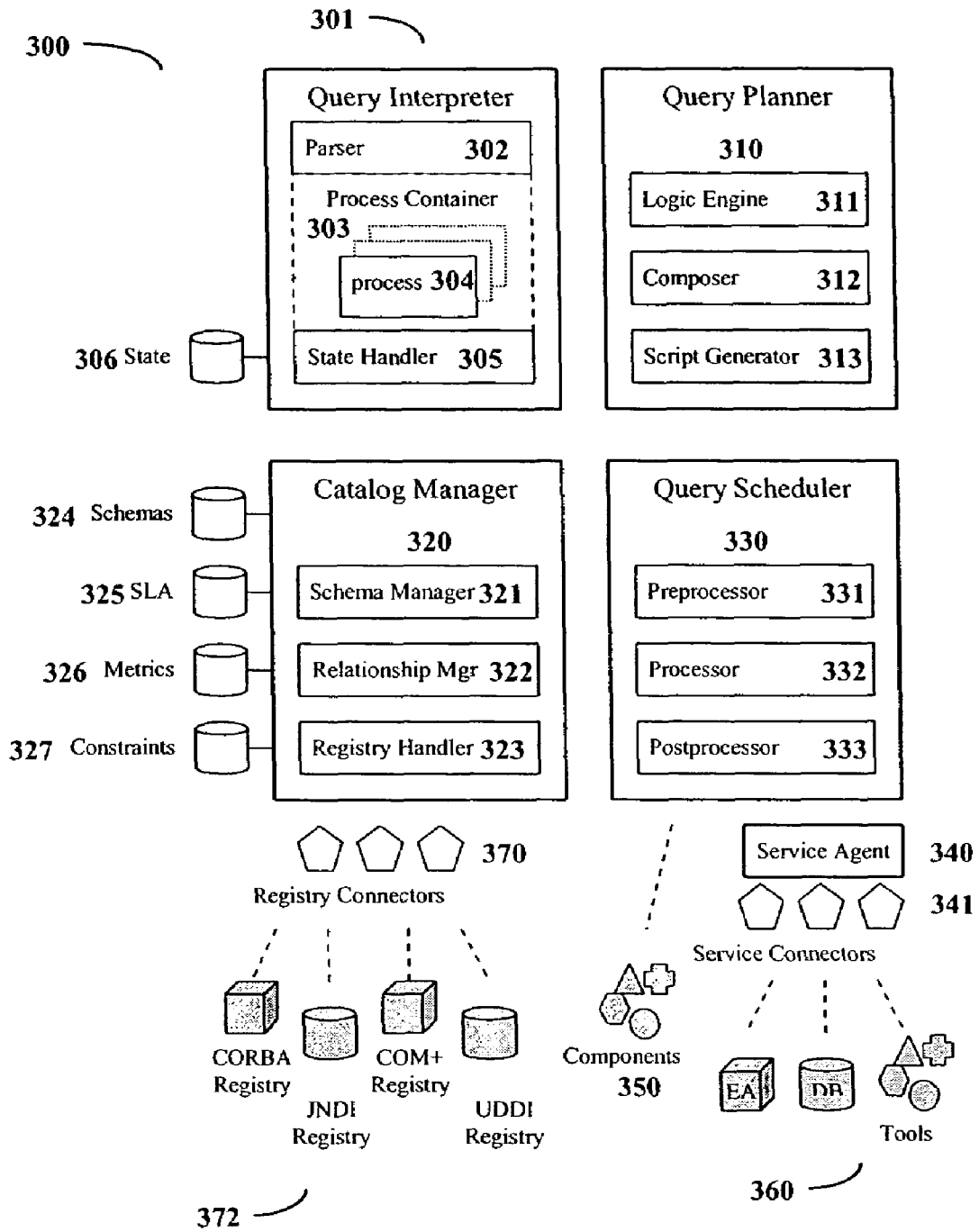
FIG. 3 is a more detailed diagram of various components and their interrelationship within a resource catalog system.

FIG. 3 depicts a more detailed embodiment of certain basic components of a resource catalog system 300 along with certain software resources in general accordance with the principles described with respect to FIG. 1. In the example shown in FIG. 3, the resource catalog system 300 comprises four components: a query interpreter 301, which generally handles parsing of query language expressions, manages overall process execution, and may maintain persistent state information; a catalog manager 320, which generally manages resource metadata, constraints, service level agreements, and historical metrics; a query planner 310, which generally utilizes a logic engine to solve constraint satisfaction problems, composes execution plans, and generates scripts based on the execution plans; and a query scheduler 330, which generally manages, selects, schedules and interacts with distributed resources and manages exception handling.

The catalog manager 320 in one aspect provides a unified view of distributed, heterogeneous registries 372, including but not limited to, e.g., CORBA Registries, JNDI Registries, COM+Registries, and UDDI Registries, which may be distributed throughout or even be external to the enterprise. Through the catalog manager 320, applications may view the distributed environment with a unified view, largely insulated from changes to the underlying structures, schemas, relationships, and formats. Resources 350, 360 required by applications may be described and managed, for example, in various standard and proprietary registries, some of which are encompassed within the examples of registries 372 illustrated in FIG. 3. The various registries 372 are preferably accessible to the catalog manager 320 through various registry connectors 370. A registry handler 323 provides a framework for abstracting basic operations on registries 372 and for interacting with registry connectors 370. These registry connectors 370 may be embodied as specific implementations of registry connection protocols, which facilitate interaction with the heterogeneous registries 372. Public application program interfaces (APIs) allow for the creation of custom registry connectors 370 for standards-based, legacy and proprietary systems containing registries 372. System operators can introduce additional new registry connectors 370 as needed or desired.

Other components of the catalog manager 320 in the instant example include a schema manager 321, a relationship manager 322, and a registry handler 323. The schema manager 321 allows system operators to define logical schemas for the registries 372 and resources 350, 360 apart from their underlying native interfaces (e.g., the native interface and physical schema of a database). The schema manager 321 manages these "global" schemas 324, which define the logical view presented to applications independent of the physical structures or interfaces of the heterogeneous resources 350, 360. Generic query forms may, for example, be used to represent a query based on a global schema. The schema manager 321 is generally responsible for maintaining the mapping (referred to as the provider mapping) between the native interfaces of the resources 350, 360 and the global schemas 324 visible to applications that use the resource catalog system 300. A schedule processor 332 of the query scheduler 330 translates input data based upon the global schemas 324 to the resources 350, 360 native interfaces. Likewise, the schema manager 321 maintains the mapping (which may be referred to as the "inter-resource mapping") between the input and output of various resources 350, 360. Should data be required to flow from one resource to another, the inter-resource mapping is the mechanism by which such dataflow occurs. In addition to mappings, the schema manager 321 may maintain information such as service-level agreements 325 and historical metrics 326 (otherwise referred to as observed performance).

The relationship manager 322 is generally responsible for handling relationships among resources. According to one example, relationships may include composition (i.e., a resource composed of other resources), abstraction (i.e., a generalization of a class of resources), and association (i.e., general associations between interrelated resources). To accomplish its tasks, the relationship manager 322 preferably draws upon a subset of the constraints 327 specific to relationships. Examples of such constraints include composition constraints, ordering constraints, routing constraints, input/output constraints, and selection constraints, all of which may influence the relationships and potential compositions of resources 350, 360 managed by the resource catalog system 300.

Another basic component of the illustrated embodiment of the resource catalog system 300 is the query scheduler 330, which is generally responsible for reliable and optimal invocation of resources 350, 360 in order to achieve overall high performance of the system. The query scheduler 330 in this example includes a number of subcomponents including a schedule preprocessor 331, a schedule processor 332, and a schedule postprocessor 333. The schedule preprocessor 331 performs selection, prioritization and preparation of tasks for optimal and reliable invocation execution. For example, the preprocessor 331 may interact with the catalog manager 320 to collect information that facilitates the later determination of which resources 350, 360 will be invoked and when. The query scheduler 330 works together with the query interpreter 301 (an example of which is described in more detail hereinafter) to schedule and run various resources 350, 360 and preferably achieve optimal utilization of resources on the system. The scheduler 330 generally lends itself to much optimization. For example, it might detect when multiple applications need the same operation on the same data, and avoid redundant operations by providing the same output data to these multiple applications. As another example, the scheduler 3330 may perform load balancing where task activities can be run concurrently.

The schedule processor 332 in this example manages a queue of tasks awaiting processing and dispatches each request as and when an applicable resource is available for processing of the task. The query scheduler may 330 perform mapping from generic interfaces defined by the schema 324 and the native input and output of resources 350, 360.

The schedule postprocessor 333 preferably monitors, records and reports quality of service (QoS) metrics 326 for individual software resource performance trends (e.g., uptime, success rate, cost), in real time if possible. The schedule postprocessor 333 additionally may keep track of resource states to identify active, inactive, and unresponsive resources 350, 360, and may update registration information of resources according to their availability. Information generated by the schedule postprocessor 333 may be drawn upon by the schedule preprocessor 331 as well as the query planner 310 to further improve system performance.

The global schema 324 provide a framework for abstracting and interfacing with individual resources 350, 360, thereby providing a uniform interface between the resource catalog system and the individual resources (i.e., software applications, databases, distributed software components, services and tools). The query scheduler 330 may interact with individual resources 350, 360 by translating from the abstract interface to the native interface and dispatching directly to the resource 350 or indirectly to other types of resources 360 through an "outboard" service agent 340 and associated service connectors 341, which may comprise specific implementations of connectors to facilitate interaction with heterogeneous tools, applications and services. Public application program interfaces (APIs) may further allow for creation of custom connectors for legacy and proprietary systems. The mapping used by the query scheduler 330 may include, for example, translation rules pertaining to parameter types, structures, interfaces, and calling mechanisms.

Individual resources 360 may require specialized translations to and from native interfaces and the generic interfaces defined by the schema 324. Such translation may be afforded by the "outboard" service agent 340, which encapsulates the connected resource and its service connector 341 so that connected software resources 360 are manageable by the query scheduler 330. The service agent 340 may be configured to monitor ongoing operation of each invoked resource 360. For example, the service agent 340 may periodically check the status of each invoked resource 360 through a "heartbeat" monitoring approach, and may be configured to report any trouble to the schedule postprocessor 333 or other components of the query scheduler 330. The monitoring function of the service agent 340 can be particularly desirable where software applications may involve lengthy processes that can run into a variety of difficulties along the way towards completion.

Yet another basic component of resource catalog system 300 is the query interpreter 301, which, in a preferred embodiment, interacts with both the query planner 310 and the query scheduler 330. In the present example, the query interpreter 301 is generally responsible for fault-tolerant execution of scripted execution plans. The query interpreter 301 in the illustrated embodiment is comprised of a parser 302, a process container 303, and a state handler 304. The parser 302 parses declarative queries to generate a query model, and parses procedural scripts to generate a process model to be executed by a process 304. Each process model generated by interpreting a script under execution is preferably assigned a managed process component 304, which executes the script's interpreted instructions from within a process container 303. For improved performance, other scripts may recycle used process instances 304. The progress of each process component 304 is recorded regularly, and may be stored persistently by the state handler 305, as a process state in a state database 306, so that the resource catalog system is protected against process failure even in the event of hardware or network failure that suspends or interrupts the process in an otherwise irrevocable manner. With current knowledge of the state of each process component 304, the process manager 301 can also perform a substitution if a particular process component 304 fails in midstream.

The query interpreter 301 controls process behavior, such as starting, suspending, resuming, or aborting process components 304. The process container 303 facilitates proper execution and fault-tolerance of executing processes, and regulates interactions between process components 304 and external components to maintain process integrity. For example, the process container 303 may help protect against the possibility of a process component 304 entering an invalid process state. The state handler 305 updates, restores, and deletes persistent process states in the state database 306 and, for example, allows the interpreter 301 to resume a suspended or interrupted process component 304 by recourse to its stored process state in the process database 306.

Another basic component of resource catalog system 300 is the query planner 310, which, in the present example, is generally responsible for generating plans of execution based upon query expressions received from the query interpreter 301. The query planner 310 in the illustrated embodiment is comprised of a logic engine 311, a composer 312, and a script generator 313. The logic engine 311 is used by the composer 312 to help solve constraint satisfaction problems based on various constraints expressed in the query expression along with constraints 327 stored by the system. In turn, the composer 312 creates a composition of functions that satisfy the query. The script generator 313 produces an execution plan, preferably in the form of a machine-interpretable script, based on the composition of functions as derived by the composer 312.

As previously described with respect to FIG. 1, queries 105 issued by applications may be utilized to invoke a variety of resources 135 via a query interpreter 107 and query optimizer 112. Resources 135 generally comprise the basic individual units available to the resource catalog system, which can be incorporated into a distributed application based upon expressions of a query 105. Examples of resources 135 include components such as web services, executables, Enterprise JavaBeans, scripts, reusable software components, enterprise applications, databases, file systems, document management systems, and other forms of software and services. Resources 135 may be listed in one or more resource catalogs 120, which may in certain embodiments access resource related information maintained in external registries 130. Examples of registries 130 include systems such as COM+ registries, UDDI registries, CORBA registries, JNDI registries, and other forms of registries, as previously noted herein. The resource catalog(s) 120 may be constructed as a logical collection of metadata with a flexible yet well-defined data structure conforming to a rooted, directed graph format (e.g., XML), which lists the identities and characteristics of the various resources 135 available to the system from time to time. Each of the resources 135 can be modeled and given a logic representation of its interfaces, minimizing or eliminating dependencies on the specifics of its defined physical interfaces (e.g., parameter types and order).

Figure 5:
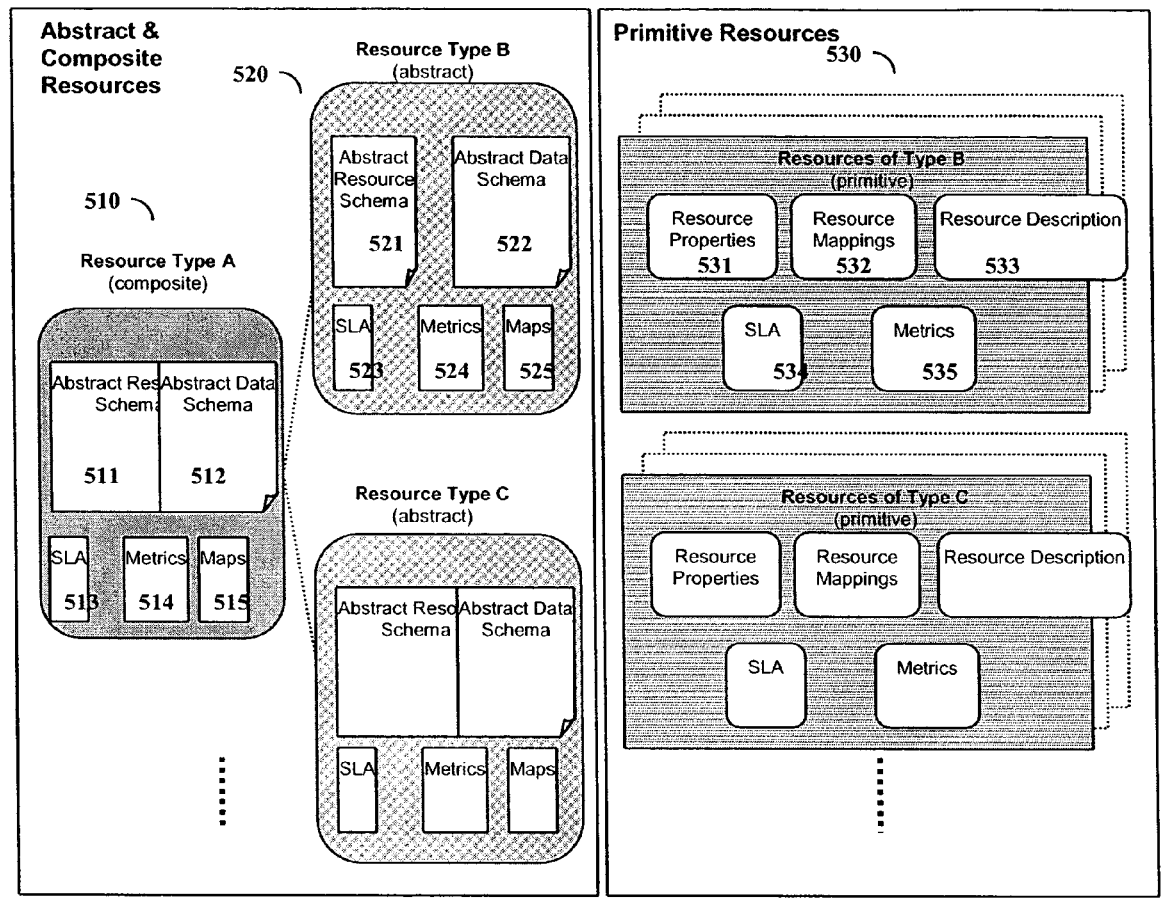
FIG. 5 is a block diagram illustrating one possible conceptual structure of a catalog of resources in a resource catalog system.

FIG. 5 depicts in more detail an example of a resource catalog 500 as may be utilized by a resource catalog system (such as the resource catalog system 100 or 300 illustrated in FIG. 1 or 3, respectively), in accordance with one or more embodiments as disclosed herein. In the example of FIG. 5, the resources are modeled according to certain aspects including resource capabilities, constraints, descriptions, interfaces, and relationships. From a logical perspective, the resource catalog 500 generally models resources as composite resources 510 (i.e., a type of resource comprised of one or more other resources that perform an aggregate capability), abstract resources 520 (i.e., a type of resource that may represent a generic class of capabilities found in other resources), and primitive resources 530 (i.e., a single resource identified by the system).

Each resource model type may be subdivided—for example, into an abstract resource scheme, abstract data schema, service level agreement, metrics, and maps. Taking the example of the composite model identified as Resource Type A 510 and abstract model identified as Resource Type B 520 illustrated in FIG. 5, the abstract resource schema 511, 521 of each such resource type defines capabilities of the composite resource 510 and the abstract resource 520, respectively. The abstract resource schema 511, 521 thereby allows representation of the overall resource and its specific interfaces. Descriptive information maintained as part of the abstract resource schema 511 or 521 may include details such as the name of the service provider, the physical location of the service, and other relevant information. The abstract resource schema may also include fields pertaining to specific functionality, which can be expressed or identified in any manner. Some examples of such functionality include the ability to retrieve and store data, the ability to encode rich media formats, the ability to make airline reservations, or the ability to make a bid on an online auction.

The abstract data schemas 512, 522 illustrated in FIG. 5 each provide a definition of data types, parameters, and other information required for communicating with the particular resource type 510 and 520, respectively. The SLA 513, 523 (Service-Level Agreement) defines the contractual information, if any, applicable to the resource type. Examples of contractual information include subscription cost, cost-per-transaction, guaranteed uptime and availability, penalties for non-compliance, and performance details. The metrics 514, 524 maintain information on observed performance and SLA compliance for a given class of resources. The maps 525 for abstract resources 520 define various resource mappings, e.g., inter-resource maps that determine how to translate between interfaces exposed by different resources to facilitate data flow between resources. In addition, maps 515 for composite resources 510 define mappings relevant to functional decomposition, e.g., aggregate resource maps that determine hot to translate between capabilities exposed by the composite resource 510 and the subset of capabilities exposed by abstract resources 520.

Primitive resources 530, as shown in FIG. 5, are individual resources that inherit a structure as defined by the details of an abstract resource 520. Primitive resources 530 are represented by such information as resource properties 531, resource mappings 532, resource schema 533, SLA 534, and metrics 535. The resource properties 531 include descriptive information for the individual resource as defined by the corresponding abstract resource schema 521. The resource mappings 532 define mappings from the abstract data schema 522 to the native interfaces exposed by the primitive resource 530. This allows for a mapping, for instance, from an abstract interface to a native interface. The resource description 533 describes specific resource physical bindings such as protocols (e.g., SOAP, MOM, HTTP, etc.), location details (e.g., domain name, URL, IP address, queue name, etc.), ports (e.g., IP ports and other network entry points), and other information relevant to describing interface and communication details. The SLA 534 and metrics 535 include, for example, service agreement and observed performance information specific to the individual primitive resource 530.

Figure 6:
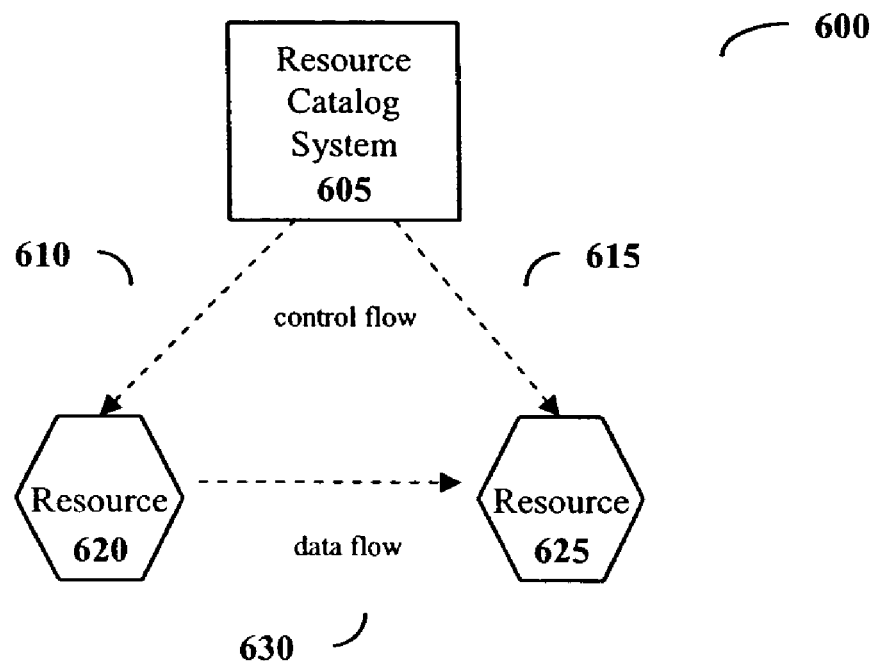
FIG. 6 is a diagram illustrating an example of the effect on control flow and data flow in a resource catalog system.

To illustrate an example of the utility of various abstract schemas and resource mappings, FIG. 6 depicts a resource catalog system 605 coordinating the activities of two resources 620 and 625. The coordination in this example focuses on control flow 610, 615, corresponding to controlling or initiating the activities of resources, and data flow 630, corresponding to the transmission of data to and from interacting resources. The resources 620 and 625 in this example may be modeled as previously described with respect to FIG. 5, for example, the resources may be modeled as abstract resources 520 with abstract data schemas 522 along with resource mappings 532. In such a case, the resource catalog system 605 accepts instructions according to abstract definitions and, at the appropriate time, translates the abstract interface information into the native format, thus enabling control flow 610, 615 to occur. As the resources 620, 625 perform their respective functions, they may need to communicate information with one another. To facilitate this interaction, the resource catalog system 605 preferably draws upon the maps 525 (see FIG. 5) of the resources 620, 625 to translate data to and from the resources 620, 625, thereby enabling data flow 630 between them.

Figure 7:
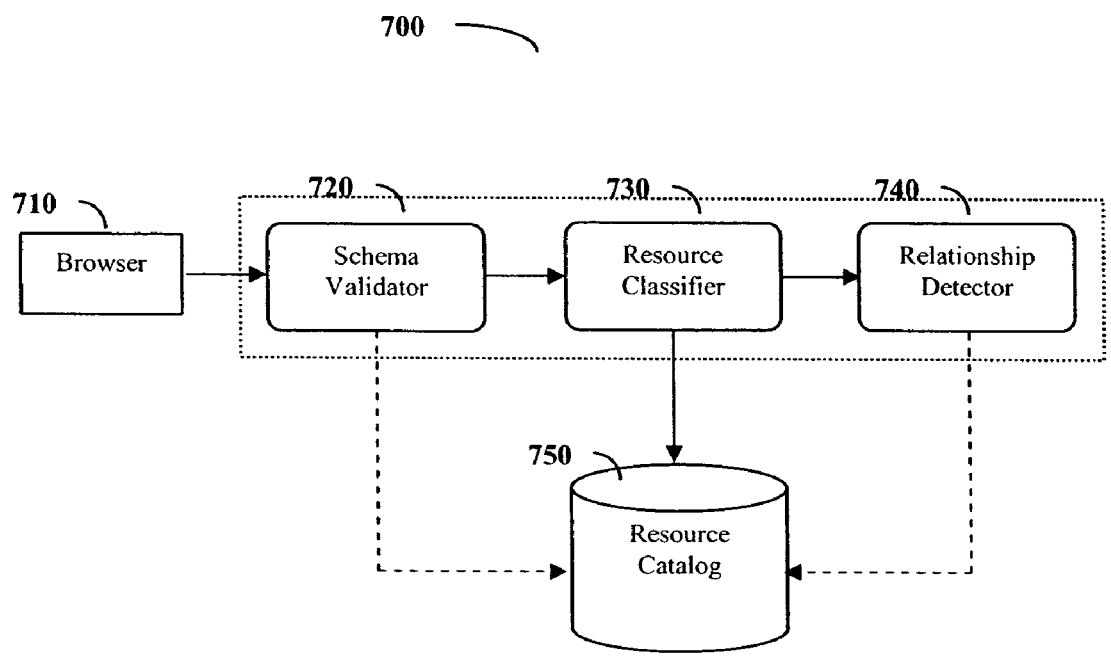
FIG. 7 is a diagram illustrating an example of a resource type definition process in a resource catalog system.

Some of the processes that may be provided by a resource catalog to facilitate its operations include resource type definition, resource registration, dynamic resource discovery, and resource analysis. FIG. 7 depicts an example of a resource type definition process 700. The resource type definition process 700 is preferably used to describe, for example, the series of steps necessary when a new resource type (also referred to as an Abstract Resource) definition is created in the resource catalog 750. The series of steps are typically defined by a designer/analyst using any suitable interface (e.g., a web-browser interface 710). Alternatively, a series of XML definition files may be imported in batch and registered with the resource catalog 750. On registration of a resource type definition, the following steps are preferably enacted. The schema (resource and data schema) and other information are validated by a schema validator 720. The registered resource type is classified by a resource classifier 730 into appropriate categories using the categorization rules. Any relationships between other resource types in the catalog are detected by a relationship detector 740 and may be signaled to the user (for final confirmation) based on rules associated with various entities (such as resource type attributes, keywords or free text) similar to those as may be utilized in the resource descriptions.

Figure 8:
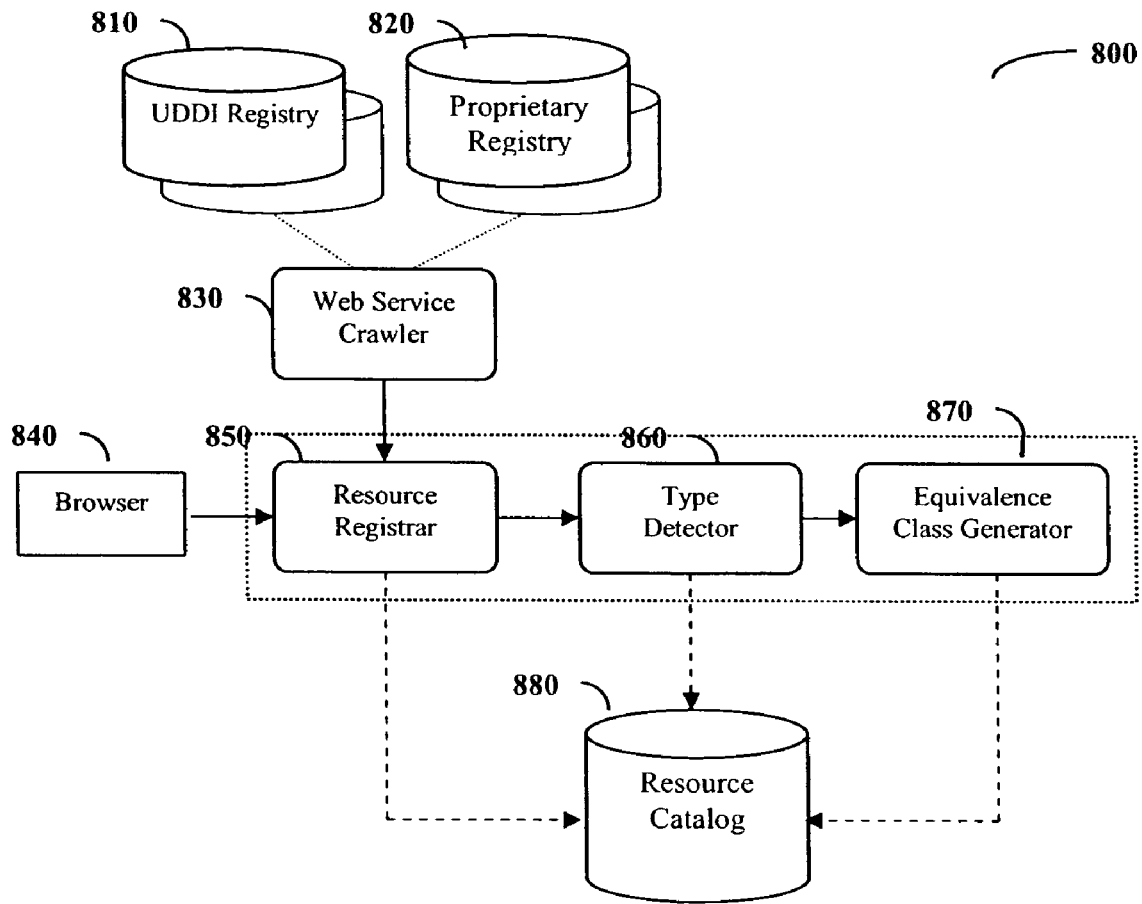
FIG. 8 is a diagram illustrating an example of a resource registration process in a resource catalog system.

FIG. 8 depicts an example of a resource registration process 800. Registration of a resource may, for example, be done manually through a web-browser 840 or automatically (or semi-automatically) through a "web-service crawler" 830 that looks up UDDI registries 810 or proprietary registries 820 via the Internet, or through other suitable means, to locate and register the resource through a resource registration process 850. Further, additional metadata on resources can be generated through rules or other techniques to complete the resource registration process. The resource registration process may, in one example, be conducted as follows. Manually (through, e.g., a web browser 840) or automatically (through, e.g., an automated process such as a web crawler 830) resource definitions are generated and registered, through the resource registrar 850. This can also be done through a batch process using XML-based definition files. A type detector 860 detects the type of a given resource based on resource capabilities, properties, SLA and other attributes. Type detection rules or policies may be utilized in this part of the process. An equivalence class generator 870 then may be invoked to generate an equivalence class for the given resource type by scoring the resource (according to various performance details) and inserting it in order within the equivalence class. The equivalence class generator will identify all resources that are functionally equivalent, but may differ in other attributes (for e.g. cost, reliability, etc.). Each step in the process may interact with the resource catalog data store 880 to update resource registration details.

Figure 9:
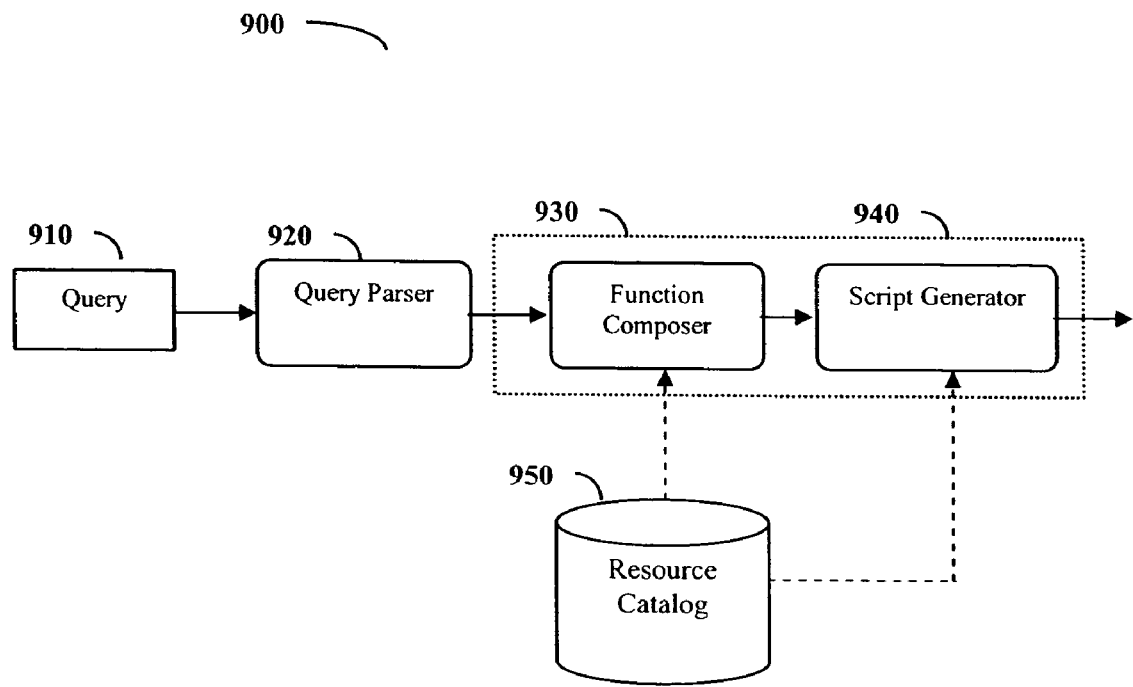
FIG. 9 is a diagram illustrating an example of a dynamic resource discovery process in a resource catalog system.

FIG. 9 depicts an example of a dynamic resource discovery process 900. The dynamic resource discovery and invocation process 900 generally involves the selection of resources and generation of an execution plan (that invokes the resources), given a declarative request (in the form of a query 910). With the resource catalog, the discovery process includes such things as resource selection, composition and enactment of the composite resource. The composition process significantly relies on the structured model of resource in the resource catalog 950, along with metadata associated with each resource. The composition process, according to one example, may be conducted as follows. A query parser 920 parses the query to construct an internal query model. A function composer 930 applies function composition techniques (based on, e.g., constraint programming, with the resource model 950 acting as the constraint model) to determine an optimal composition of the resource. A script generator 940 generates an execution script (in a procedural scripting language), preferably with alternate resources at each step, so that failure of any one resource will enable picking another equivalent resource.

Figure 10:
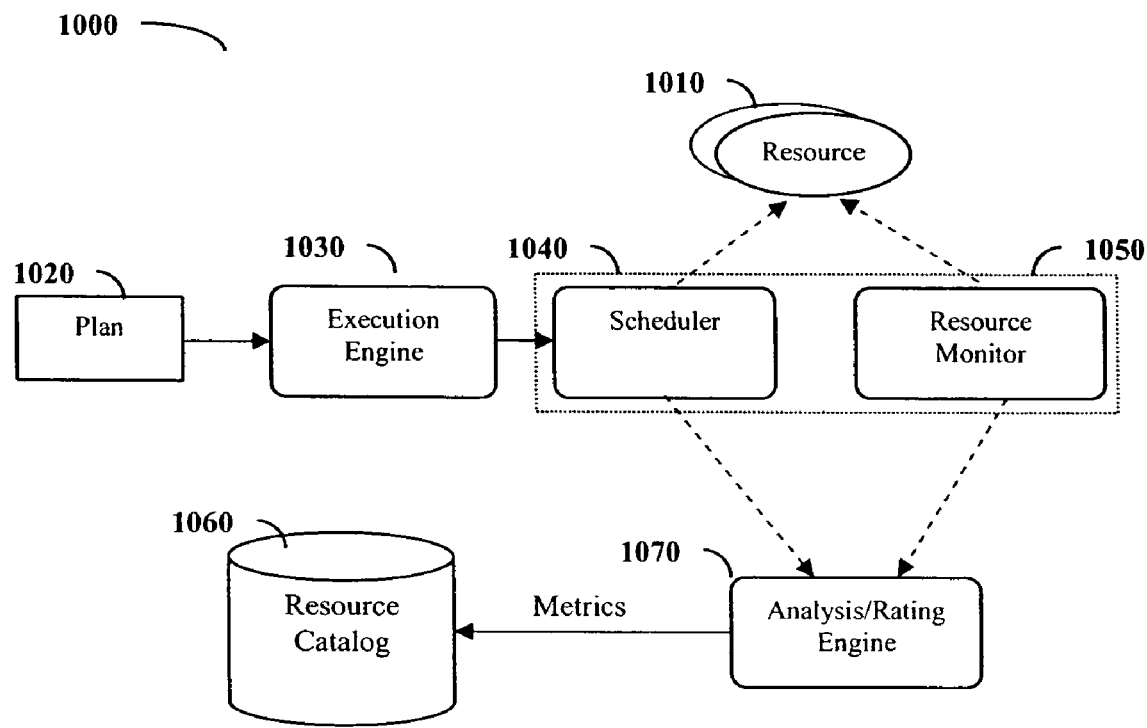
FIG. 10 is a diagram illustrating an example of a resource analysis process in a resource catalog system.

FIG. 10 depicts an example of a resource analysis process 1000. Resource analysis enables analyzing resource performance data and determining metrics or rating services. The process steps may include the following. An execution engine 1030 executes an input plan 1020 and invokes a scheduler 1040 for faciliting the scheduling of tasks and their assignment to various resources 1010. The scheduler 1040 reports resource status information to an analysis engine 1070 in the case of, e.g., quality-of-service issues or transaction errors. A resource monitor 1050 monitors the various resources 1010 and reports information on such things as, e.g., resource outages, overloads or other failures. An analysis/rating engine 1070 determines various metrics such as average down times, reliability levels, expected response times given a load factor, or rating information for a given resource, based upon feedback from the scheduler 1040 and resource monitor 1050. Such information may be recorded within the resource catalog 1060 for scoring a resource while scheduling tasks to it.

Figure 2:
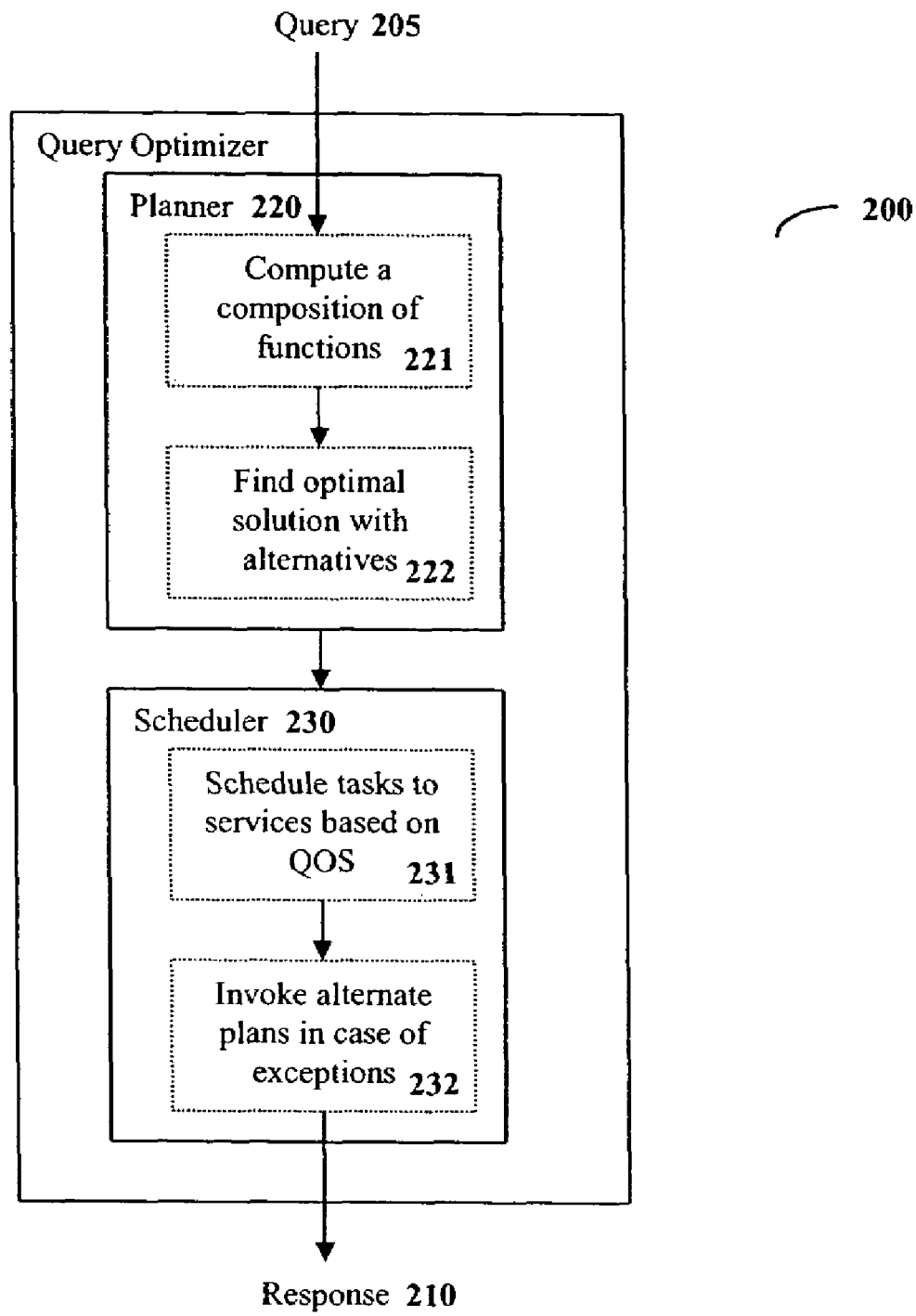
FIG. 2 is functional block diagram of an optimizer for the resource catalog system in accordance with a particular embodiment as disclosed herein.

FIG. 2 depicts a functional block diagram example of a query optimizer 200 as may be used in a resource catalog system. The query optimizer 200 is preferably comprised of a planner 220 and a scheduler 230 that perform complementary roles to optimally invoke the functions exposed by resources to satisfy a query 205. The planner 220 determines a composition of functions based on the input query 205. To satisfy a given query, one or more functions exposed by one or more resources may be required. The planner 220 determines the necessary set of functions (indicated by 221 in FIG. 2) and then finds an optimal overall solution (indicated by 222) in the form of an execution plan with alternative paths. The execution plan itself may be represented as a program, e.g., expressed in a procedural scripting language, with statements and expressions to indicate the order in which functions of resources shall be invoked.

Once the planner 220 has generated a plan, preferably in the form of a script, the scheduler 230 may schedule tasks to be executed by resource functions. The scheduling of tasks, as indicated by 231 in FIG. 2, may be determined in part based on the Quality of Service (QOS) criteria of the query 205 and the observed performance of selected resources. For instance, the QOS criteria for a given task may indicate that a particular function must be performed at or under a specified cost and within a given timeframe. The scheduler 230 then determines which resources match the requested QOS criteria and invokes those resources to satisfy the tasks. A distributed computing environment may be subject to immense uncertainties of performance, quality and numerous points of failure, which may interrupt the functioning of distributed resources. Thus, the scheduler 230 preferably observes the resources to make corrections should a failure or other suboptimal performance occur. When such exceptions arise the scheduler 230 identifies alternative paths, as indicated by 280, in the plan to satisfy the query 205.

A resource catalog system configured in accordance with one or more embodiments as disclosed herein may, among other things, allow applications to interact with distributed resources to perform particular operations. Applications need not interact directly with the resources but instead may interact indirectly via the resource catalog system. One possible method that may be used for interaction between applications and the resource catalog system is through a declarative invocation language. A declarative language can be used to form a "query" that the resource catalog system interprets and, by drawing upon or interacting with various resources, formulates a suitable response for the requesting application. A procedural language extension to the declarative invocation language can also be provided by the resource catalog system. In such a case, users and applications may directly submit "scripts" in the procedural language. When the resource catalog system accepts a "query" in the declarative language, it can automatically generate an execution plan using the procedural language. The procedural language may be structured to provide many of the conventional programming constructs for control (e.g., if, while), data (e.g., variables, assignments), and execution (e.g., calls). It can also be configured to provide additional capabilities to natively support such things as multi-tasking execution (e.g., spawn).

Examples of statements in a declarative language and procedural language are illustrated in FIGS. 11 and 12, respectively. FIG. 11 depicts an example of a possible format for a query 1100 in a declarative language. Statements 1100 may be formulated, in this example using an "INVOKE" keyword, to indicate a request for invocation of various composite resources and abstract resources (or other types of resources, if provided). A resource clause 1120 indicates a listing of a specific composite resource or abstract resources (e.g., "SEARCH_SERVICE") and an abstract capability (e.g., "search") exposed by the resource (which in the present example is an abstract resource). A selection clause 1130 ("WHERE") allows for expression of selection constraints 1140 to narrow and refine the applicable primitive resources to satisfy the request. A data clause 1150 ("GIVEN") allows for expression of data constraints 1160 to indicate the desired capabilities of resources to be invoked and the data parameters to be passed to the invoked resources. A results clause 1170 ("RESULTS") allows for indication of the interested results field(s) 1180.

FIG. 12 depicts an example of a possible format for a script 1200 in a procedural language. A procedural code for the script is, in this example, authored as an XML document 1210. The enclosing element <script> 1220 demarcates the beginning and ending of the script and indicates the procedural language version (e.g., "major", "minor" version numbers), a user-friendly name (e.g., "Example Script"), and the visibility of the script (e.g., "access" may indicate "public", "private", etc.). Variables 1230 may be declared indicating their name, type (e.g., "string", "integer", "object", etc.), and visibility. Execution behavior is specified around <task> elements 1240. A task is a single unit of execution, and a script may contain one or many tasks. Tasks may be executed in parallel if desired, thus simplifying the development of multi-tasking or multi-threading applications. Values may be assigned and reassigned to variables throughout the execution of the script as specified by <assign> statements 1250. To interact with other scripts or with other programs written in other languages, a <call> statement 1260 may be specified. The <call> statement 1260 in this example begins with an operation attribute (e.g., op="xci:acme.utility.Search::initialize") that indicates the operation to execute. The operation is defined by a namespace (e.g., "xci" to indicate the component interface namespace), a fully-qualified name (e.g., "acme.utility.Search"), and a function (e.g., "search") following a scope operator (e.g., "::"). The <call> statement 1260 also may facilitate input (e.g., <in>) and output (e.g., <out>) for parameter passing with the component. Conditional statements, such as the <if> statement 1270, allow for controlling the flow of execution within a given task. Other examples of conditional statements include the <while> statement and <for> statement, not depicted in the example. A "test" attribute of a conditional statement 1270 allows for complex conditional expressions. A <query> statement 1280 allows for embedding a query expressed in the declarative language into the procedural script. To execute other tasks declared within the script, a <spawn> statement 1290 may be used to indicate the tasks, by name (e.g., taskA, taskB, etc.) or otherwise, that are intended to execute in parallel.

FIG. 13 depicts a component interface description 1300 as may be utilized, for example, in connection with a declarative or procedural language as described above. The component interface in this example is authored in the form of an XML document 1310 and is preferably comprised of a single component description 1320, metadata 1330, and one or more operations 1340. The component description 1320 generally indicates the component description language version (e.g., major, minor, etc.), the package to which it belongs (e.g., "acme.example"), and the name of the component (e.g., "Workflow"). The metadata 1330 indicates the such things as the version of the component, the author, and other human readable comments.

The component may expose one or more interfaces referred to as operations 1340. In one aspect, operations indicate a specific unit of functionality. The operation description 1340 specifies, e.g., the name of the operation and its visibility (e.g., "public", "private", etc.). Operations may have any number of input and output parameters 1350, including no input parameters or no output parameters. Input and output parameters 1350 may be defined by their name and a parameter type (e.g., "string", "float", "integer", "boolean", etc.), and may also indicate whether or not the parameter is required when the operation is called. Operations may raise exceptions upon reaching an abnormal execution condition. Such exceptions may be specified in a "throws" clause and may be listed using <fault> declarations 1360. The fault declaration specifies the name of the exception that may be raised by the operation. Each operation may also specify a particular interface, which maps to an implementation. An implementation declaration 1370 specifies the means by which the operation is executed. In the present example 1300 illustrated in FIG. 13, the implementation is mapped to a particular class and method in the Java programming language. Additionally, operations may be implemented using any number of conventional programming languages and frameworks including but not limited to Enterprise JavaBean, Executables, Shell scripts, Web services, CORBA components, COM+ components, and others.

Figure 4:
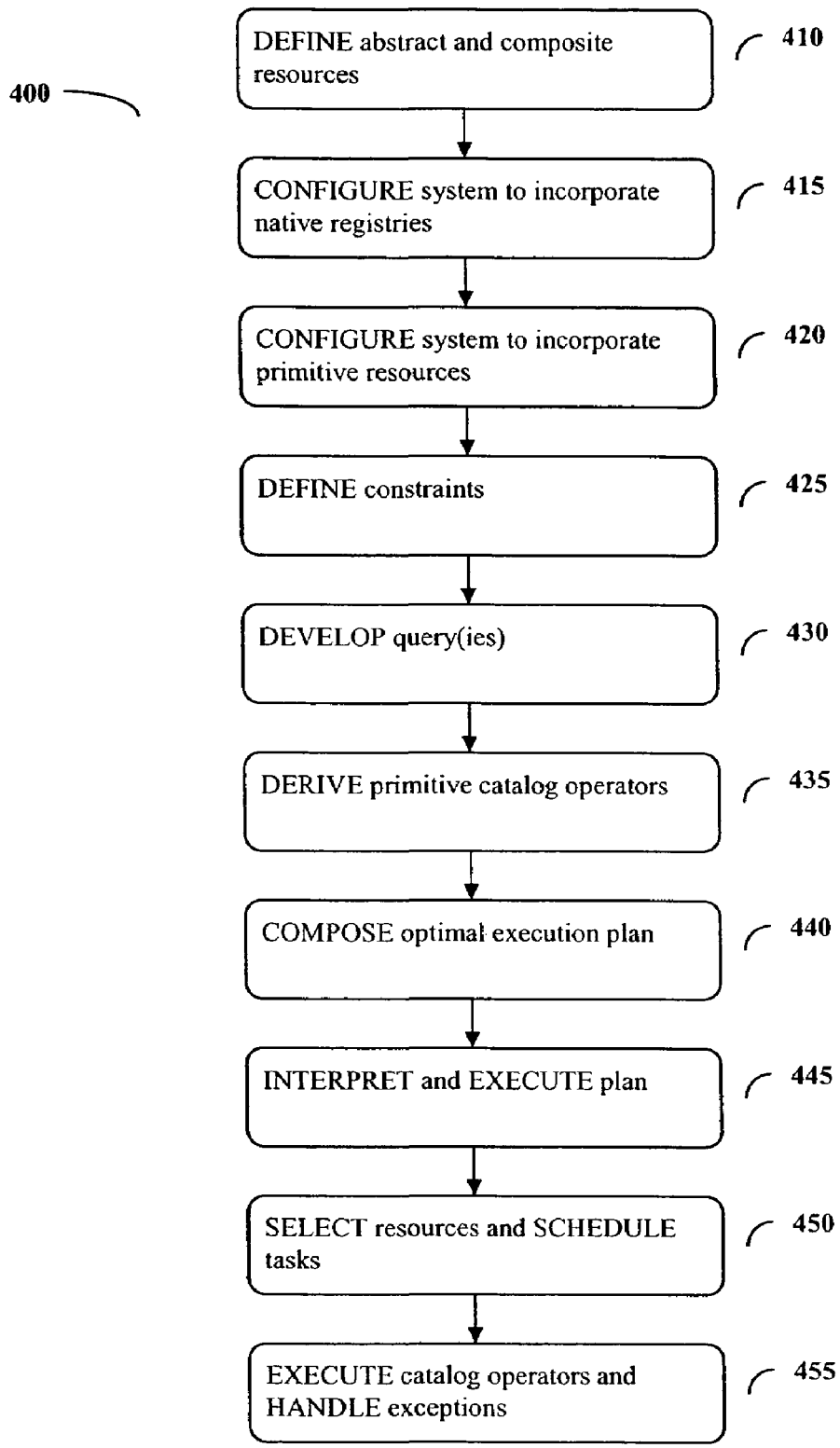
FIG. 4 is a process flow diagram illustrating an example of enterprise resource management using a resource catalog system.

FIG. 4 is a process flow diagram illustrating an example of a process 400 for resource management and invocation using a resource catalog system. The process 400 of FIG. 4 will, for convenience, be described with respect to the exemplary resource catalog system 300 illustrated in FIG. 3, but it should be understood that the principles and techniques relating thereto may be used with other systems as well. In a first step 410, metadata structures are defined to represent composite and abstract resources (e.g., classes of software applications and services), and data items upon which the applications may operate. Next, in step 415, the resource catalog system is configured to integrate native resource registries, with the ultimate goal of shielding users to the extent possible from the heterogeneity of resource registries. As part of this step, any necessary registry connectors 370 or interface definitions or schemas 324 are added to the catalog manager 320. In a next step 420, the resource catalog system is configured to integrate native or primitive resources, with the ultimate goal of shielding users to the extent possible from differences in the native interfaces or infrastructures of the resources, or from their ease or speed of access, age, version, and so on. As part of this step, any necessary service connectors 341 or resource interface data may be added to the catalog manager 320. Next, in step 425, any additional relevant constraints may be defined in the system. These constraints may include, for example, input/output constraints, sequencing or ordering constraints, and other composition constraints.

In a next step 430, programmers or analysts develop one or more queries in a declarative language for invocation of distributed resources. Alternatively, scripted applications in a procedural language may be directly specified. Queries and scripted applications may be stored persistently for later use by the resource catalog system. In step 435, the resource catalog system, and particularly the query interpreter and query optimizer thereof (such as query interpreter 107 or 301 and query optimizer 112, 200 or 310 illustrated in FIGS. 1, 2 and 3, respectively) interprets the query statements (directly or embedded from within the scripted applications) to derive primitive catalog operators such as the functions exposed by primitive resources as described earlier, or any other catalog operators provided in the system. Next, in step 440, the query planner (depicted as, e.g., 220 and 310 in FIGS. 2 and 3, respectively) generates an execution plan, preferably using constraint-satisfaction solving techniques operating on constraints maintained in the resource catalog and specified in the query.

In step 445, the resource catalog system interprets and executes the plan, which is preferably specified in a procedural scripting language. Next, in step 450, the resource catalog system selects and schedules the execution of the catalog operators, which may be carried out according to considerations such as system loads, resource availabilities, and applicable optimization policies. In the context of the resource catalog system 300 illustrated in FIG. 3, for example, some portion of step 445 would generally be carried out by the process container 303 working in conjunction with the composer 311 and script generator 313 of the query planner 310. Additionally, some portion of step 450 would generally be carried out by the preprocessor 331 or the query scheduler 330. In the next illustrated step 455, the resource catalog system executes catalog operators to support the invocation of distributed resources that are to be coordinated, according to the particular command that is to be performed, and handles exceptions reliably by invoking other suitable providers of the catalog operator or executing another branch in the earlier derived plan of execution. In the context of the resource catalog system 300 illustrated in FIG. 3, if the catalog operator involves invocation of a resource (such as an application or service) 350 or 360 through a function exposed by the primitive resource, then the scheduler 330 accesses the primitive resource 350 directly or indirectly 360 through an appropriate service agent 340 and/or service connector 341, at the same time preferably mapping parameters from abstract interfaces to native interfaces to support control flow and data flow to optimally coordinate resource activities without entangling the calling applications with the specifics of the underlying distributed environment.

A method and system for dynamic functional composition of resources may also be provided in connection with the resource catalog system, and, in particular, may be applied within the query optimizer (e.g., 112 shown in FIG. 1 or 200 in FIG. 2) of the resource catalog system. Fulfilling a query may require the selection of multiple resources, construction of a process using the resources, and invocation of the necessary resources in a reliable and optimal way. Dynamic composition deals with the first two steps of fulfilling a query that conventionally are dealt with through software integration, which is generally static. Dynamic composition of resources can be viewed as a discrete combinatorial problem, in that it involves finding a permutation of resources capable of fulfilling a given query. In general, discrete combinatorial problems are said to be NP-complete, implying that there exists no general and efficient algorithm for solving them. By leveraging the rich metadata about the resources maintained in the resource catalog system, the techniques disclosed herein relating to dynamic functional composition can be characterized as being a "constraints-based approach" to solving the problem. Such an approach can significantly reduce the search space by eliminating the resources that are not necessary to fulfill a request and arrive at a suitable permutation of the remaining resources. This approach makes use of a logic programming model, thus exploiting non-determinism, relational form, and declarative semantics. A constraint solver is utilized to prune the number of possible permutations, making this constraints-based approach particularly useful for addressing dynamic composition.

In one aspect, certain of the disclosed techniques for dynamic composition of resources, where the resources represent functions, can be formalized within a functional programming paradigm, which includes two at least two specific modularity concepts of (i) higher-order functions and (ii) composite functions. A higher-order function generalizes a set of primitive functions, and a composite function combines a subset of primitive functions. A functional program seeks to evaluate a higher-order function for a given set of input values that represent the constraints.

For example, a request for custom-packaged information that is distributed across multiple repositories may require querying the distributed repositories, assembling the information, applying multiple transformers for different information types (e.g. XML, images, audio, video, documents), and delivering the custom-packaged information based on the expressed communication preference. This series of steps may be modeled as a functional program, where the primitive functions are the available resources (repositories, translation tools, and communication packages), the query requesting the information invokes a higher-order function with a set of input constraints, and the objective is to compute the composition of primitive functions that satisfies all the constraints.

Some definitions that may be used in connection with dynamic composition in a functional programming paradigm are as follows:

Function: A mapping f: X→Y that is unique (for every x in X there is a unique y in Y) and total (for all x in X there is a y in Y).

Primitive Function: A function that can directly be bound to one or more implementations by resources (or functions instances).

Abstract Function: A parameterized higher-order function that can be instantiated to yield primitive functions.

Composite Function: A composition of functions, f°g(x).

A particular dynamic composition methodology as disclosed herein can be framed in terms of a functional programming paradigm as follows: Given a higher-order function with constraints on input parameters, find the composition of primitive functions that evaluates the higher-order function.

The dynamic composition problem as stated above may be solved using a constraint-based solution technique. According to one example as disclosed herein, a dynamic composition methodology involves the following three sub-processes or phases:

a) Modeling, which involves creating an abstract model of resources and resource-relationships in the resource catalog, with extensive metadata on resource functions including resource properties, data parameters, Quality of Service (QoS) attributes and performance metrics. The resource metadata and relationships form the model for constraints on the composition of functions.

b) Constraint solving, which involves selecting the subset of resources (functions) and determining one or more sequences of functions that satisfy all constraints. This sub-process eventually results, for example, in the creation of a function graph where the nodes represent the resources and the edges represent the control flow.

c) Process (or plan) generation, which involves generation of a procedural process script from the function graph by using the resource metadata in the resource catalog.

In general, the resource catalog inherently has a model of resource functions that determine the constraints for composition. According to one embodiment, functions in the resource catalog may be represented as either Primitive or Abstract. Primitive functions, in this example, are directly associated with implementations from multiple resources. Abstract functions, in this example, are generalizations of primitive functions, thus creating a function hierarchy of which the abstract function is the root. Ordering relationships can be defined between any two functions with a mapping of input and output parameters. Further, a query may encode a set of values on data parameters that also act as constraints.

Constraints in the resource catalog may be modeled, for example, in the following ways:

Primitive functions and abstract function hierarchies.

Ordering relations between functions.

Rewrite query as constraints, in particular, the data parameter values specified in the query. Other techniques for modeling and solving constraints in the resource catalog may be used as well.

Figure 15:
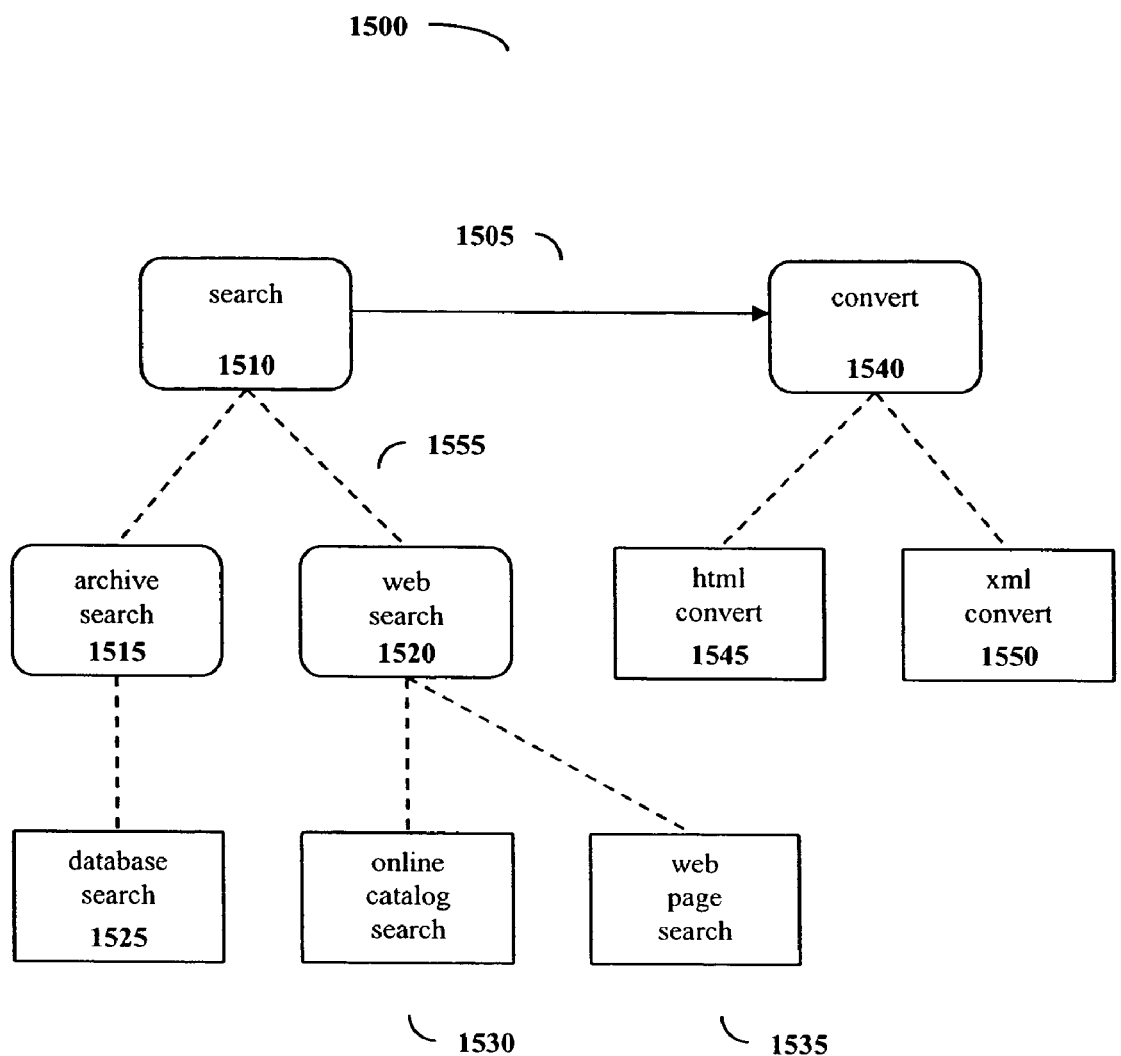
FIG. 15 is a conceptual illustration of an example of a functional hierarchy and constraints as may be utilized for functional composition in a resource catalog system.

FIG. 15 depicts a conceptual example of a function hierarchy 1500 presented with a few illustrative sample constraints. The function hierarchy 1500 in this example is comprised of an abstract higher-order function, search 1510, along with two abstract higher-order sub-functions, archive search 1515 and web search 1520. Archive search 1515 represents an abstract function for the primitive function database search 1525, while web search 1520 represents an abstract function for the primitive functions online catalog search 1530 and web page search 1535. Convert 1540, which in this example is invoked sequentially after search 1510, represents another abstract function, in this case for primitive functions html convert 1545 and xml convert 1550. The function hierarchy 1500 in FIG. 15 is depicted with constraints indicating functional abstraction 1555, which indicates the relative level of abstraction between higher-order and primitive functions. The function hierarchy 1500 also defines ordering constraints 1505, which indicate the relative sequencing required among and between various abstract and primitive functions. Thus, as noted above, in this example Convert 1540 is invoked sequentially after search 1510.

In addition to representing information in the form of, e.g., constraints, a dynamic composition technique may utilize decision variables that correspond to the resources (functions in this case). For example: a decision variable $x_k$ may correspond to function $f_k$ such that $x_k = <a_k, b_k>$ where $a_k(b_k)$ is the set of functions after (before) $f_k$ in the composition.

A constraint-solving methodology as disclosed herein can be formulated in terms of a technique to address the following goal: Given a set of decision variables, their corresponding domains, and constraints, find an assignment of values for the decision variables with their corresponding domains that satisfies all the constraints. Constraint solving may, for example, use a constraint propagation technique to determine the decision variables, and a search technique to find values for the unsolved decision variables. According to one technique, constraint solving may be carried out using the following steps:

Identify the set of functions, $F_1$ that is not part of the composition (in which decision variables have a null value).

Solve ordering constraints to find values for decision variables in $F_1$ (in which decision variables have a non-null value).

Search to find a feasible solution with values for all decision variables in $F_1$.

A dynamic composition process may utilize a Constraint Solver and a Search Engine to perform these steps. The Constraint Solver, for example, may determine a set of valid decision variables, $x_k$, that correspond to primitive functions, and the Search Engine may generate a path that traverses all selected functions, resulting in a function graph.

Another aspect of a resource catalog system as disclosed herein may involve process generation, which generally refers to the technique of automatically generating an execution script, given a flow graph. Given a sequence of functions, the main goal of this process is to enable proper data flow across functions. Process generation may draw upon the information in the resource catalog which determines the mapping of parameter data from a generic format (e.g., XML) to an implementation specific format. Any other data translations across functions may likewise be handled through process generation. The resulting process script may generally be represented using a procedural language.

Figure 16:
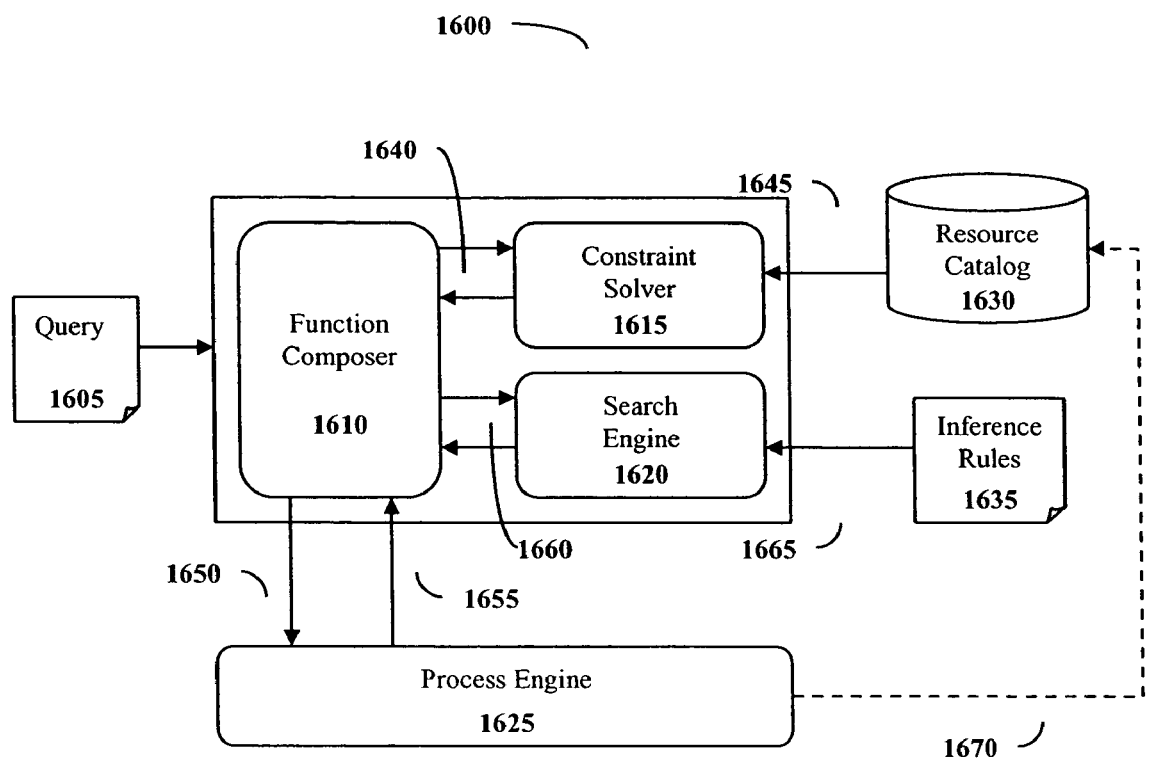
FIG. 16 is a block diagram of a function composition component for the resource catalog system in accordance with a particular embodiment as disclosed herein.

FIG. 16 depicts an example of a functional composition component 1600 as may be used in a resource catalog system. The composition component 1600 in this example is comprised of a function composer 1610, a constraint solver 1615, and a search engine 1620. The function composer 1610 accepts instructions or queries 1605 in the form of a declarative language, which expresses invocation requests and corresponding constraints. The function composer 1610 exchanges constraints 1640 with the constraint solver 1615. The constraint solver 1615 retrieves domain values and function models 1645 from the resource catalog 1630. The constraint solver 1615 determines the values for the corresponding decision variables and returns the values 1640 to the function composer 1610. The function composer 1610 feeds the decision variables with values 1660 to the search engine 1620. The search engine 1620 retrieves 1665 inference rules 1635 to determine the optimal functional composition graph, which it then returns 1660 to the function composer 1610. The composition component 1600 may then generate a script (not depicted in FIG. 16), which is transmitted (as indicated by flow arrow 1650) to the process engine 1625. Throughout execution of the script, the process engine 1625 preferably monitors resource behavior and updates 1670 the resource catalog 1630 with metrics concerning observed performance. When execution completes, the process engine 1625 returns the results 1655 to the function composer 1610.

A method and system for dynamic selection and scheduling of resources may also be provided in connection with the resource catalog system, which may be applied, for example, within the query optimizer (e.g., 112 in FIG. 1 or 200 in FIG. 2) of the resource catalog system. Analysis of scheduling algorithms for periodic and aperiodic tasks within a real-time system has been well studied conventionally. The thrust of such activity is to find an optimal solution that guarantees satisfactory completion of hard-deadline periodic tasks while minimizing response time of soft-deadline aperiodic tasks. The environment for such analysis is typically constrained to a closed environment that may be suitable to most real-time operating systems. Given that simplification of the problem, the framework for the analysis considers tasks with predictable worst-case computation time, optional statically defined period, optional time-based deadline constraints, and a priority. The tasks are scheduled and processed preemptively on a shared resource that may be loosely defined as a general-purpose, central processing unit.

Various strategies are preferably employed by a dynamic selection and scheduling process to take advantage of processor idle time improve overall performance. In other situations, incorporating feedback from active and completed tasks may improve scheduling intelligence. Although these algorithms may yield performance gains in certain contexts within the intended domain of real-time systems with general-purpose shared processors, they may be limited in effectiveness when considering a real-time system in a distributed computing environment, such as the resource catalog system.

The differentiating characteristics attributed to the distributed computing environment should be taken into account when considering an approach to optimally schedule tasks in a real-time system. In a distributed environment, for example, there exist multiple available resources, as opposed to a shared, centralized processing unit. The resources specialize to accommodate certain types of tasks, rather than providing general-purpose processing capability suitable for any type of task. Specific selection criteria in a resource catalog system allow for matching of each task to its intended resource or resource type. Each resource also possesses unique performance characteristics and varying warrants governing its performance. Additionally, the environment allows for coordination, but typically not preemption, when processing tasks. These characteristics result in significantly different considerations when addressing optimal resource scheduling.

Thus, dynamic selection and scheduling may be conducted drawing upon conventional techniques, but with certain modifications. For example, an initial step is identifying or otherwise classifying characteristics of a real-time system having n tasks, $T_1, \ldots, T_n$, which tasks may be comprised of periodic tasks and aperiodic tasks. Periodic tasks generally have worst-case computation requirements $w_i$, a period $t_i$, and a deadline $d_i$, where $w_i \leq d_i \leq t_i$. Aperiodic tasks, by contrast, generally have no set deadline, and therefore may execute in FIFO (first in first out) order with some adjustment according to priority. All tasks may be assigned a priority, $s_i$, for which would be allowed an increase or decrease throughout execution.

Beyond the foregoing conventional definition and representation of tasks in a real-time system, the distributed environment in which a resource catalog system may operate can introduce additional characteristics for consideration and utilization. For example, a selection criteria, $c_i$, may be defined to assist match making of tasks with appropriate resources. A submitter's profile, $p_j$, may be utilized so as to accommodate resource preferences, service agreements, and other relevant criteria associated with the submitter. Input from a submitter may include multiple tasks, T, such that {p,c,T} denotes the input. Along with tasks, the overall environment supports n specialized resources, $R_1, \ldots, R_n$, as described previously. For each resource, metadata describes the interfaces, capabilities, observed performance, and other pertinent details useful for making selections and scheduling decisions. The specialized resources and metadata, among other things, may be taken into account by the dynamic selection and scheduling process.

Figure 14:
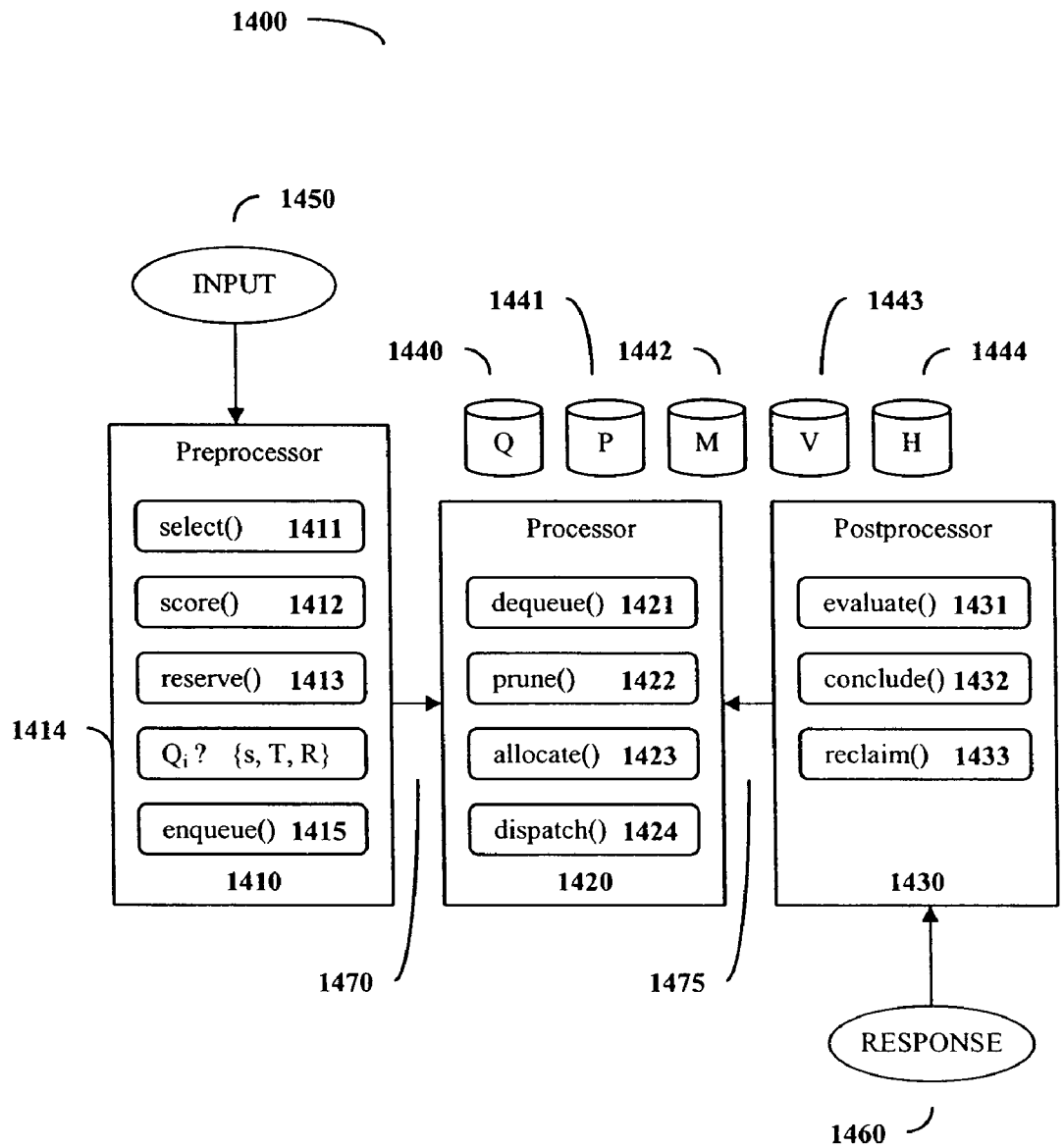
FIG. 14 is a conceptual illustration of certain elements of a query scheduler as may be used in a resource catalog system.

Adaptive selection and scheduling occurs primarily in the query scheduler as described earlier and likewise, according to one example, as depicted in FIG. 14. In FIG. 14, a scheduler 1400 is illustrated as subdivided into three major subsystems or blocks, a preprocessor 1410, a processor 1420, and a postprocessor 1430. The preprocessor 1410 may, for example, accept new tasks, assign a priority to a task, reserve resources for a task, and place the tasks on a queue. The processor 1420 generally retrieves tasks from a queue according to priority, deadline, and availability of resources, and then dispatches tasks to resources. The postprocessor 1430 in this example is configured to accept results from resources, evaluate the results, and return results.

Events drive the scheduler 1400 via the preprocessor 1410 and postprocessor 1430. The preprocessor 1410 handles activation, i.e., events indicating periodic task is ready, and input 1450, i.e., events indicating new aperiodic tasks need to be carried out. Activation and input events 1450 may be driven through the query planner to the scheduler 1400. The postprocessor 1430 handles response events 1460 indicating results returned from resources.

Below are described, in connection with FIG. 14A, a set of functions that may be used to perform adaptive selection and scheduling. FIG. 14A described certain symbols used in the text below. For purposes of explanation, it is assumed that an input or activation event 1450 has introduced a new job of the form j:={p, c, T}.

The function select(c,$R_{all}$):$R_{sub}$ 1411 is used to determine the subset of resources, $R_{sub}$ that satisfy the selection criteria outlined by the submitter, c. Flexible selection criteria enables the resource catalog system to support matching of tasks to corresponding resources that satisfy the requirements of the task. For example, should task T require processing on a specialized resource for full-text summation, the criteria c may include conditions useful in identifying such resource. Because the system is based on resource catalogs, the necessary metadata against which selections may be performed will generally be available. In the present example, c may correspond to c:={capability='summation' }. The function select(c,$R_{all}$) 1411 will issue a query against the resource catalog to yield a results set including resources that satisfy the computational requirement for the corresponding task T. In addition, the criteria c may include more complex conditions or rules such that c:={(capability='summation') AND (cost-per-unit$\leq$10) AND (turnaround$\leq$30)}. Increasingly complex conditions and rules may be constructed to fine tune the selection of resources to satisfactorily process task T in the input 1450. Upon completion of select(c,$R_{all}$), the system determines the appropriate subset of resources, $R_{sub}$.

Selecting the best suited set of resources from all available resources may depend on both the capabilities of the resource, such as ability to perform a summation, as well as on quality characteristics, such as cost, turnaround time, or error rates. Additionally, jobs may wish to refine selection according to locality. For instance, a job may wish to process tasks on a certain subnet of a network to ensure high-bandwidth communication between the different steps in the overall process. In the case of rules-based criteria, a job owner may dictate usage of a particular resource (e.g., 20% of all processing performed by a specified provider) in accordance with offline contractual relationships. The various criterion span hard-constraints and soft-constraints, thus allowing the selection algorithm to opportunistically refine the set of resources for the task.

Another aspect of preprocessing may involve prioritization of the job. The function score(p):s 1412 illustrated in FIG. 14 represent priority score(s) of the job and may be used in connection with prioritization. The function generally considers the submitter's profile to calculate the relative priority weighting of the job. As opposed to assuming that all aperiodic tasks receive lesser priority weighting, it may be appropriate to grant certain aperiodic tasks corresponding to end user interaction a higher priority, to preserve end user experience with immediate results. Submitters with special service agreements may also receive higher priority for their jobs.

Reservations on resources involve, in FIG. 14, the function reserve(s,$R_{sub}$) 1413, which updates the reservations collection (i.e., resource reservations list V, 1443). The same function may also take into account a ready queue (Q, 1440) of input events awaiting dispatch processing to determine whether the priority score for the current job merits a reservation of any resources.

The preprocessor 1414 collects the determined values for $Q_i:=\{s, T, R_{sub}\}$ 1414 and enqueues them with the function enqueue ($Q_i$) 1415. The preprocessor 1414 then signals the processor 1470.

The processor 1420 is responsible for, among other things, determining the next awaiting job from the ready queue(Q, 1440) in order to dispatch it to the available resource. Getting the next job from the ready queue 1440 is not necessarily a trivial FIFO operation. To perform this operation, the dequeue function, dequeue( ):$Q_i^k$ 1421, preferably locates the highest priority item with resource requirements falling within the set of idle resources, $R_{idle}$.

Computationally expensive activities exist within the realm of distributed computing. This characteristic of the environment lends itself favorably to the notion of task pruning. In other words, there exist certain activities performed by the distributed system that may be avoided by "reusing" results from previous activities. For instance, an image conversion activity performed on a particular image need not be repeated each time. If, at a future time, a task requires image conversion for the same image in an identical manner as already performed, the results (i.e., the converted image) may be reused. Therefore the opportunity to prune tasks exists within the system.

The scheduler 1400 may be configured to take advantage of task pruning opportunities by evaluating results from previously processed tasks. When a task is processed, the scheduler 1400 attempts to find a matching task in a historical collection (M, 1442) maintained on an ongoing basis by the scheduler 1400. When a match is located, the current task is pruned by reusing the historical results. On the other hand, when a match cannot be located, the task profile is added to the historical collection (M) 1442 for future reference. In most cases, to ensure validity of the match, the control flow and data flow parameters of the tasks under consideration should be analyzed to determine a potential match. For many situations, a comparison of the hard-constraints (i.e., type of capability) may be sufficient. It is also possible to achieve performance improvements by generating a hash of the parameters to aid in the comparison.

There may be specific cases where pruning will not be useful. For instance, processing of a financial transaction for a particular consumer represents a case that generally must repeat without pruning. The pruning function 1422 is preferably configured to take into account the nature of the task and whether pruning applies. Straightforward indicators may be recorded in resource metadata to indicate whether pruning of related tasks is allowable.

The notation prune($Q_i^k$):$Q_i^k$ may be used to symbolically represent the prune function 1422 illustrated in FIG. 14. The prune function 1422 preferably takes the $k^{th}$ task of the ith queue item, $Q_i^k$, which supplies the function with the necessary information to determine if the task exists in the historical collection (M) 1442 and whether pruning is allowable. The prune function 1422 returns $Q_i^k$ only if the task cannot be pruned.

Allocation of resources preferably takes place after pruning, when processing is required (i.e., when pruning did not result in a complete match). The allocation function 1423 may be represented symbolically by allocate($Q_i^k$):$R_i$, which first checks for the set of $Q_i^k.R_{sub} \cap V$ to see if a reserved resource awaits the task to be performed. When a resource reservation for the current task exists, the allocation function 1423 preferably returns the first available resource without further evaluation. In the absence of a reservation, the allocation function 1423 returns the first instance (i.e., resource) $R_i$ found in $Q_i^k.R_{sub} \cap R_{idle}$. As previously mentioned, the selection function 1411 orders the resources according to the best compliance with hard- and soft-constraints, so it may be assumed that $R_i$ is relatively optimal for this task. For greater precision, additional evaluation may be performed at this juncture to evaluate suitability of the resource $R_i$ for the specific $Q_i^k$ instance awaiting in the ready queue.

With a valid resource $R_i$ located for instance $Q_i^k$, the scheduler 1400 may dispatch the present task using the dispatch function 1424. Thereafter, the processor 1420 rests and the scheduler 1400 awaits completion of the task and the resulting response from the active resource $R_i$. The processor 1420 of course may process other tasks and events while awaiting completion of the dispatched task.

The postprocessor block 1430 illustrated in FIG. 14 is generally responsible for accepting response events 1460 from resources as they complete processing of their currently assigned task. The initial reaction to a response event is to evaluate the results received from the resource, which is carried out by the evaluate function 1431. This operation is used to determine satisfactory completion of the task before declaring the item finished. The evaluate function 1431 may be symbolically denoted by evaluate(u):f, and may be configured to accept the results u from the resource and to generate a feedback record f. The evaluate function 1431 may further be configured to crosscheck the pending queue (P, 1441) to ensure that all objectives were met.

If evaluation proves successful, the postprocessor 1430 uses the conclude function 1432, which may be symbolically represented as conclude(f,$P_i$), to update results for the pending item, reconcile any matching records in the historical collection (M) 1442, and update the historical metrics (H) 1444. Once all items in the job complete successfully, the conclude function 1432 may be invoked to return the results to the requestor. Finally, the reclamation of the resource takes place. The reclaim function 1433, which may be symbolically denoted as reclaim($P_i$), preferably updates the set of resources R and reservations (V, 1443) to indicate that the resource is available again. The last act of the preprocessor 1430 in the present example is to return a signal 1475 to trigger the processor 1420, thus allowing the processor 1420 to dispatch another task to the resource that has now become available as a result of completing the task.

The description provided above does not get into details of the various conventional techniques which are known for optimizing resource utilization. Instead the description is focused more on the various aspects of adaptive selection and scheduling in a resource catalog system. The adaptive selection and scheduling techniques described herein accommodate, and are generally compatible with, conventional techniques for optimizing resource utilization and other related techniques. Various conventional strategies such as slack stealing, opportunistic allocation, earliest deadline first, etc. may be used in conjunction with the adaptive selection and scheduling techniques described herein.

Additional variations and modifications relating to the previously described techniques are possible. Some of these variations include the following:

Boosting priority scores routinely to improve response time for aperiodic tasks to avoid prolonged waiting times particularly in cases where users interact directly with the system.

Reserving a subset of available resources specifically for tasks submitted by interactive users to reduce response time.

Incorporating rules for determining priority scoring to accommodate more complex determination of scores.

Incorporating rules for selecting among available resources to accommodate more complete selection criteria.

Seeding historical information based on supplied Service Level Agreement(s) to reduce the learning curve for observed performance of resources.

Another aspect of resource provisioning in an open system, particularly one involving commerce, may include the facilitation of negotiated provisioning of resources. One permutation of the techniques for resource allocation described herein involves a mechanism for negotiation, whereby resources are employed in a cost effective manner. As in a real-world system, negotiation for resources may be divided into a multi-phase process involving, for example, a bid-phase and a provision-phase. The bid-phase generally entails the requestor's solicitation of services from a provider, who in turn submits a bid to the requester. The requestor may compare bids from competing providers of like services to ascertain the most desirable set of providers as based on the details of their bids. The final set of resources may include those from a single provider corresponding to the most attractive bid or a from set of providers ordered, for example, according to the most-to-least attractive bids.

A negotiation function, symbolically denoted as negotiate (p,$R_{sub}$):$R_{bid}$, may be introduced in a query planner (e.g., 310 in FIG. 3) or scheduler 1400. The negotiate function may, for example, leverage the requestor's profile p to interact with the resources $R_{sub}$ in order to solicit bids. In some cases, the negotiation function may need to communicate with the provider in real-time to solicit a bid given the specifics of the job. In other words, a job with a large number of tasks may receive a discount from certain providers, and this evaluation can generally only be made at the time of job submission. There also may be situations where the negotiation function need not directly contact a provider to solicit a bid. For instance, the submitter's profile p may include information related to previously negotiated contracts to suggest which resources are suitable for processing the tasks in the job. Also, the profile may indicate that only resources with 99% success rates should be utilized, and this may be determined by a query of observed performance characteristics found in the historical information (H, 1444). Ultimately, the negotiation function may return a revised subset of resources $R_{bid}$ containing the resources that passed the negotiation phase, ordered, if desired, according to attractiveness of the bid.

During the provision-phase, the functionality of which in the present example of FIG. 14 would generally reside in the processor 1420 of scheduler 1400, the system would call upon the dequeue function 1421 to dequeue items from the ready queue (Q, 1440) according to the ordering of the subset of resources $R_{bid}$. In this manner, the resource utilization is affected by the negotiated agreements made with the provider by the resource catalog system on behalf of the job owner.

Additionally in real-world systems, context generally underlies the selection of services. For instance, a user's perspective while browsing web sites across the Internet underlies the user's search criteria and drives the continual refinement of search results. In a dynamic selection system, context can be effectively used to improve selection of services to satisfy resource-provisioning requests.

Since metadata is stored in the resource catalog system and may be drawn upon to identify the capabilities of resources, it is possible to incorporate additional types of information with the metadata. One such type of information is contextual information. Similar to the way that keywords may be used to tag pages on a web site to improve search results, it is possible to incorporate context-based tags for resources. Indexes based on context, instead of typical keyword indexes, may be used to refine searches based on the user's intentions as well as his actions. This contextual information is useful to identify matches for requests in a manner that goes beyond typical selection criteria.

In the present example, the selection criteria c may be expanded to include contextual criteria, and, similarly the select function 1411 may be enhanced to act upon the expanded selection criteria c. The select function 1411 may refine its evaluation by, for example, comparing context criteria with context tags found in the metadata for resources. The results returned by the various functions improve because the hard- and soft-constraints are augmented by the contextual hints added to the selection criteria c.

In addition, context awareness can be used to improve presentation of the results culled from the selected resources. Based on context, certain presentation templates may be selected. These presentation templates may exist for specific types of context, such as, for example, shopping, researching, communicating, and e-learning, as well as others. The results may then be returned to the requester according to the presentation template to enhance overall usage and experience.

According to certain embodiments as disclosed herein, a resource catalog system applied in a distributed computing environment may have the effect of shielding the developer of distributed applications to a significant degree from the complexities underlying the distributed environment. Resources, no matter what form they may take (such as, for example, EXE, COM+, Web service, etc.) can be modeled and given a logical representation of their interfaces within the resource catalog system. This abstraction significantly mitigates the dependencies on the specifics of the resource's native defined physical interfaces (e.g., parameter types and order, bindings, data formats, etc.). Application developers can be insulated from the exact details of application implementation (COM+, CORBA, Shell script, etc.), access (UDDI, JNDI, etc.), and infrastructure (RPC, RMI, etc.), so that the developer can focus on the actual high-level logic and functionality of the desired application.

Likewise, data accessible via resources regardless of structure type (e.g., relational, XML, spreadsheet, JPEG image, MPEG audio/visual, etc.) can be modeled and given a logical representation of their physical structure. A resource catalog system according to certain embodiments as disclosed herein may take neutral XML queries and handle distributed query management and translation to native query syntax (SQL, XQuery, proprietary). Application developers can thereby be insulated from the exact details of physical data format, structure, and interface. The resource catalog system may provide support for unstructured data sources (e.g., rich media), as well as traditional structured and semi-structured data sources. The resource catalog system may also, in one aspect, provide users with adaptive management of distributed resources via, e.g., a query optimizer, within an intuitive script-and-run environment for developing and deploying scripted applications as well as directly supporting queries expressed in a simple declarative language.

In yet another aspect, a resource catalog system according to one or more embodiments as disclosed herein may dynamically combine and connect functionality and data from heterogeneous applications to support cross-functional, multi-organizational processes and insulate distributed applications from changes to the distributed resource and data environment. The basic units of manipulation that may be performed on the collection of resources managed by the catalog are called operators. The set of operators for a catalog is extensible. The standard user and application program interface to a resource catalog system is a declarative programming language, statements in which are analyzed to derive supported catalog operators. The resource catalog system preferably supports a procedural language extension to the declarative language in order to support conventional procedural programming techniques.

Similar to the way in which relational databases may shield developers from data dependencies, resource catalog systems may shield developers from resource dependencies. In relational databases, however, the typical set of operators is limited to relational operators like selection, projection, and join. Unlike the limited set of database operators, catalogs allow for extensible operators tailored to the contents and semantics of collections of distributed resources. Given the mixed content and extensible operator characteristics of resource catalogs, a universal "invocation" operator for resources exists, and resources represented by metadata in a catalog may be utilized optimally through this resource invocation operator based on the software resources' changing availabilities. Reducing software utilization through an invocation operator allows for efficient usage of software resources based on capabilities and availabilities, as expressed in representative metadata, rather than on physical interfaces and other dependencies.

Catalogs also support optimization, i.e., a management infrastructure for planning, scheduling, optimization and execution of operators. This optimization infrastructure allows for formal models and measured results for specific optimization of operators based on the comparative capabilities of available distributed resources. Further, similar to concurrent query optimization in relational databases, catalogs may support concurrent invocation optimization. This allows for optimization of resource utilization across processes, programs, and applications.

A resource catalog system may alleviate certain inefficiencies caused by resource dependencies as previously described. It may also yield one or more of the following benefits. First, a resource catalog system may permit a substantially seamless, simplified homogeneous interface for utilization of system resources without requiring knowledge of the respective locations, formats, infrastructure, or performance of the various distributed resources. Application developers and system users may therefore develop and use applications without regard to the details of the distributed components of the system, and without necessarily requiring custom code or policies to account for those details. Application developers need not engage in custom programming to account for interface and format heterogeneity of the various resources, and are free to focus on higher-level logic and functionality.

A resource catalog system may further provide optimal usage of available resources. Resource independence enables efficient integration and coordination of distributed software services. The formal model permitted by operators on the resource catalogs and introduction of the invocation operator means that real-time optimization of resource invocation may be achieved. Capabilities such as concurrent invocation optimization applied to inter-process usage of shared resources may be reliably and measurably attained.

As yet another potential benefit, a resource catalog system may eliminate development overhead. Resource independence enables efficient implementation and maintenance in support of custom processes. With resource independence that the catalog model brings, application developers may focus exclusively on business logic without having to deal with tightly interwoven integration and data manipulation logic.

According to certain embodiments, a computer system employing a resource catalog system may be provided with flexibility such that application developers and system operators can readily create distributed applications and evolve such applications in response to system needs using straightforward development tools, without requiring expensive rewriting of application code or systems integration.

Other benefits and advantages that may be provided by various embodiments as disclosed herein may include one or more of the following:

Adaptability such that distributed applications can adapt early and rapidly to changes in conditions of load and resources as tend to be prevalent in distributed resource environments.

Performance enhancement through the ability to effectively utilize task prioritization, load-balancing, parallel processing, and other techniques to allow optimal utilization of resources and attain high quality of service.

Scalability with the ability to add, remove and replace resources with minimal impact.

Improved resource availability through dynamic resource management.

Increased reliability, data integrity, process persistence, and resiliency.

Manageability of resources in an environment such that multiple applications can be managed as a single "virtual" application with detailed monitoring, bottleneck identification, and auto-correction so that the system can respond quickly to prevent application slowdowns or outages.

While preferred embodiments of the invention have been described herein through illustration, and not by way of limitation, many variations are possible which remain within the concept and scope of the invention. Such variations would become clear to one of ordinary skill in the art after inspection of the specification and the drawings. The invention therefore is not to be restricted except within the spirit and scope of any appended claims.

What is claimed is:

1. A system for adaptive functional composition of software components, to fulfill requests for higher-order functions, comprising a processor for utilizing:
 a catalog of system resources including tools, applications, web services, and data repositories each implementing one or more functions and constraint information relating to the system resources;
 a constraint solver configured to select a subset of the system resources based upon the request and the constraint information in said catalog; and
 a composer configured to optimally sequence the functions and cause execution of the sequence of functions based upon the selection of system resources by said constraint solver;
 wherein said catalog comprises an abstract model of functions, their inter-relationships, and their constraints;
 wherein said constraint solver is configured to determine one or more sequences of functions that satisfy all constraints of the selected system resources, and to generate a function graph based thereon; and
 wherein said composer is configured to generate a procedural process script from the function graph generated by said constraint solver.

2. The system of claim 1, wherein said constraint information comprises: (i) function hierarchies of abstract function comprised of primitive functions, and (ii) ordering relations between functions.

3. The system of claim 1, wherein said catalog comprises metadata relating to the functions included therein, and wherein said composer utilizes said metadata in generating said procedural process script.

4. The system of claim 1, wherein said procedural process script is provided to a process engine to cause execution of the selected sequence of functions.

5. The system of claim 1, wherein said constraint solver is provided with a set of decision variables that correspond to the system resources, and wherein it is configured to determine an assignment of values for the decision variables that satisfies all constraints of the selected system resources.

6. The system of claim 5, wherein said constraint solver employs constraint propagation to attempt to solve for the decision variables, and a search technique to find values for any unsolved decision variables.

7. The system of claim 6, wherein said constraint solver is configured to determine a set of valid decision variables that correspond to primitive functions eligible for inclusion within the subset of system resources, and to generate a path that traverses all of the eligible primitive functions to generate said function graph.

8. The system of claim 1, wherein said constraints are processed by said constraint solver according to specific domains.

9. The system of claim 1, wherein said constraint solver utilizes a constraint satisfaction parameter to select said subset of system resources, and wherein constraint satisfaction may be relaxed or restricted to allow alternative selections of system resources.

* * * * *